US006785068B2

(12) United States Patent
Takizawa et al.

(10) Patent No.: US 6,785,068 B2
(45) Date of Patent: Aug. 31, 2004

(54) COLOR FILTER SUBSTRATE AND ELECTRO-OPTICAL DEVICE, MANUFACTURING METHOD FOR COLOR FILTER SUBSTRATE AND MANUFACTURING METHOD FOR ELECTRO-OPTICAL DEVICE, AND ELECTRONIC EQUIPMENT

(75) Inventors: Keiji Takizawa, Hotaba-machi (JP); Yoshihiro Otagiri, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/194,407

(22) Filed: Jul. 12, 2002

(65) Prior Publication Data

US 2003/0021000 A1 Jan. 30, 2003

(30) Foreign Application Priority Data

Jul. 13, 2001 (JP) ........................................ 2001-213427
Jun. 14, 2002 (JP) ........................................ 2002-174961

(51) Int. Cl.[7] ........................... G02B 5/22; G02F 1/1335
(52) U.S. Cl. ........................ 359/885; 349/104; 349/106; 349/107
(58) Field of Search .......................... 359/885; 349/104, 349/106, 107

(56) References Cited

U.S. PATENT DOCUMENTS

| 5,734,457 A | * | 3/1998 | Mitsui et al. | 349/106 |
| 6,122,027 A | * | 9/2000 | Ogawa et al. | 349/113 |
| 6,281,952 B1 | | 8/2001 | Okamoto et al. | |
| 6,563,559 B2 | * | 5/2003 | Noritake | 349/113 |
| 2003/0128310 A1 | * | 7/2003 | Takizawa et al. | 349/106 |

FOREIGN PATENT DOCUMENTS

| JP | 11-052366 | | 2/1999 | | |
| JP | 11052366 | * | 2/1999 | ......... | G02F/1/1335 |
| JP | 11-242226 | | 9/1999 | | |
| JP | 11-305248 | | 11/1999 | | |
| JP | 2000-098919 | * | 4/2000 | ............. | G09F/9/00 |
| JP | 2000-267077 | | 9/2000 | | |
| JP | 2000-267081 | * | 9/2000 | ......... | G02F/1/1335 |
| JP | 2000-298271 | * | 10/2000 | ......... | G02F/1/1335 |
| JP | 2001-033768 | | 2/2001 | | |
| JP | 2001-033778 | * | 2/2001 | ......... | G02F/1/1335 |
| JP | 2001-125094 | * | 5/2001 | ......... | G02F/1/1335 |
| JP | 2001-166289 | * | 6/2001 | ......... | G02F/1/1335 |
| JP | 2001-281648 | | 10/2001 | | |

OTHER PUBLICATIONS

Communication from Japanese Patent Office re: counterpart application.

* cited by examiner

*Primary Examiner*—Audrey Chang
(74) *Attorney, Agent, or Firm*—Harness, Dickey & Pierce, P.L.C.

(57) ABSTRACT

To provide a color filter substrate and transflective type electro-optical device capable of ensuring both brightness of reflective display and saturation of transmissive display. Also, to reduce the difference in color between reflective display and transmissive display. A reflective layer 211 having openings 211a is formed on a substrate 201, and a color filter 212 having colored layers 212r, 212g, and 212b is formed thereupon. Deep color portions 212c are provided to the colored layer, above the openings 211a of the reflective layer 211.

10 Claims, 24 Drawing Sheets

FIG. 20
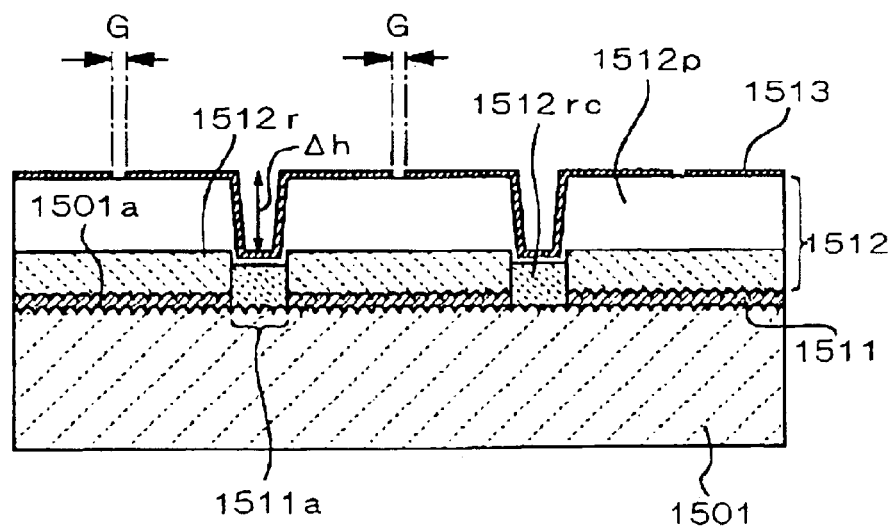
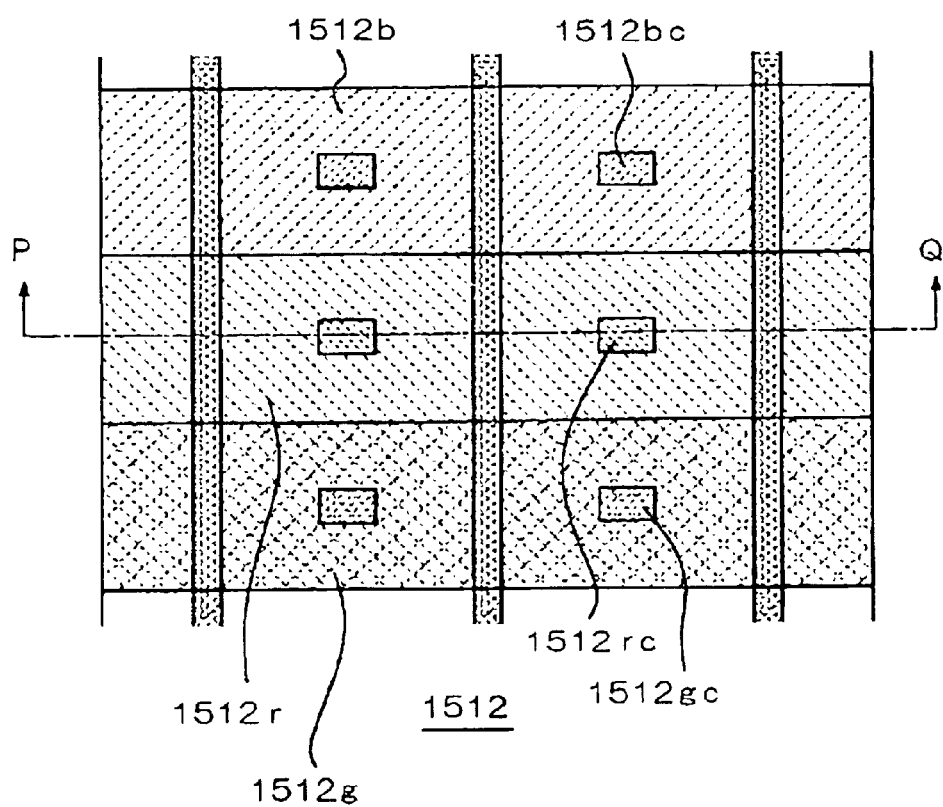

COLOR FILTER SUBSTRATE AND ELECTRO-OPTICAL DEVICE, MANUFACTURING METHOD FOR COLOR FILTER SUBSTRATE AND MANUFACTURING METHOD FOR ELECTRO-OPTICAL DEVICE, AND ELECTRONIC EQUIPMENT

BACKGROUND OF THE INVENTION

1. Technical Field

The present invention relates to a color filter substrate and an Electro-optical device, and a manufacturing method for a color filter substrate and a manufacturing method for an Electro-optical device, and particularly relates to a structure of a color filter suitably used with a transflective Electro-optical device.

2. Background Art

Conventionally, transflective liquid crystal display panels enabling visualization of both reflective display using external light and transmissive display using illumination light from a back-light or the like, have been known. Such transflective liquid crystal display panels comprise a reflective layer for reflecting external light into the panel, and are configured so that illumination light from a back-light or the like can transmit through the reflective layer. As for this type of reflective layer, there are those having patterns with openings (slits) at a predetermined ratio for each pixel of the liquid crystal display panel.

FIG. 18 is a schematic cross sectional diagram illustrating the schematic configuration of a conventional transflective liquid crystal display panel 100 in model fashion. This liquid crystal display panel 100 has a configuration wherein a substrate 101 and a substrate 102 are adhered one to another by a seal material 103, with liquid crystal 104 being sealed in between the substrate 101 and the substrate 102.

A reflective layer 111 having openings 111a for each pixel is formed on the inner face of the substrate 101, and a color filter 112 having colored layers 112r, 112g, and 112b, and a protective layer 112p, are formed on this reflective layer 111. Transparent electrodes 113 are formed on the surface of the protective layer 112p of the color filter 112.

On the other hand, a transparent electrodes 121 are formed on the inner face of the substrate 102, so as to intersect with the transparent electrodes 113 on the opposing substrate 101. Now, alignment film, hard transmissive film, etc., is formed on the transparent electrodes 113 on the substrate 101 and the transparent electrodes 121 on the substrate 102 as necessary.

Also, a phase difference plate (¼ wavelength plate) 105 and polarizing plate 106 are sequentially disposed out-of-plane on the substrate 102, and a phase difference plate (¼ wavelength plate) 107 and polarizing plate 108 are sequentially disposed out-of-plane on the substrate 101.

The liquid crystal display panel 100 configured thus is attached in the state of a back-light 109 disposed at the rear side thereof in the event of being installed in electronic equipment such as cellular telephones, portable information terminals, and the like. With this liquid crystal display panel 100, external light is transmitted through the liquid crystal 104 following the reflection path R in daytime or in bright places such as indoors and is reflected on the reflective layer 111, and transmits through the liquid crystal 104 again and is discharged, so reflective display is visually recognized. On the other hand, the back-light 109 is lit at nighttime or dark places such as outdoors, whereby the illumination light of the back-light 109 which has transmitted through the openings 111a is transmitted through the liquid crystal display panel 100 following the transmission path T and is discharged, so transmissive display is visually recognized.

SUMMARY OF THE INVENTION

However, with the above-described conventional transflective liquid crystal display panel 100, the light passes through the color filter 112 twice, coming and going, with the reflection path R, while the light only passes through the color filter 112 once with the transmissive path T, so there is the problem that the saturation deteriorates for transmissive display as compared to the saturation for reflective display. That is to say, with reflective display, the brightness of the display generally tends to be insufficient, so there is the need to set the light transmissivity of the color filter 112 high to secure brightness for the display, but this means that sufficient saturation cannot be obtained for transmissive display.

Also, the number of times of light passing through the color filter differs between reflective display and transmissive display as mentioned above, so the color of the reflective display and the color of the transmissive display greatly differ, and accordingly there is the problem that this presents an uncomfortable sensation.

Accordingly, the present invention has been made to solve the above problems, and it is an object thereof to provide a color filter substrate capable of securing both brightness for reflective display and saturation for transmissive display in the event of application to a display device capable of both reflective display and transmissive display. It is also to provide a transflective Electro-optical device capable of securing both brightness for reflective display and saturation for transmissive display. It is also an object to realize display technology capable of reducing difference of saturation between reflective display and transmissive display.

In order to solve the above problems, a color filter substrate according to the present invention comprises: a substrate; a colored layer disposed on the substrate, and having a light color portion, and a deep color portion with higher light density than the light color portion; and a reflective layer, disposed on the substrate, and having a transmitting portion essentially capable of transmitting light; wherein the deep color portion is disposed so as to overlay at least the transmitting portion in planar fashion.

According to the present invention, due to a colored layer having a light color portion and deep color portion being provided, and the deep color portion being disposed so as to overlay at least the transmitting portion in planar fashion, light passing through the transmitting portion of the reflective layer passes through the deep color portion, so the saturation of transmitted light can be improved over the conventional.

Now, light density means the capabilities per unit thickness of the colored layer for causing deviation of the wavelength distribution of light, wherein, in the event that the light density is high (great) the color (colorfulness) of the transmitted light is intense, and n the event that the light density is low (small), the color of the transmitted light is weak. In the event that the colored layer contains coloring material such as pigment or dye of the like, this light density normally has a positive correlation with the amount of the coloring material.

As for specific parameters having correlation with the concept of color density, for example, the Y value in an XYZ color system corresponding to visually perceived transmissivity or brightness or the L* value in a Lab color system, i.e., the integrated value of spectral transmissivity in the visual light range (e.g., the wavelength range of 380 nm to 780 nm), can be used. The Y value and L* value have a negative correlation with color density (e.g., an inversely proportionate relation). Accordingly, the Y value or L* value in the deep color portion will be smaller than the Y value or L* value in the light color portion.

As for specific parameters having correlation with the concept of color density, the area of polygons configured of points corresponding to the hue of the colored layer on a chromaticity diagram may be used. The area of polygons has a positive correlation with color density (e.g., a proportionate relation). Accordingly, the area of a polygon configured of points corresponding to the hue of a deep color portion on a CIE (1931) color system xy chromaticity diagram or a CIE (1976) color system a*b* chromaticity diagram, for example, is greater than a polygon configured of points corresponding to the hue of a light color portion on the same chromaticity diagram. Note that in the event of having a tri-color colored layer, for example, the polygon is a triangle.

Further, the transmitting portion of the reflective layer is essentially capable of transmitting light, and a transmitting portion may be configured by providing an opening in part of the reflective layer, or a transmitting portion may be configured by forming a part of the reflective layer thinner.

In this case, the light color portion is preferably disposed so as to overlay the reflective layer excluding the transmitting portion in a planar manner, with the deep color portion disposed on the substrate where the light color portion is not disposed. With this configuration, the light color portion and the deep color portion are formed on different planar regions, so the thickness of the color filter can be reduced, while the surface thereof can be configured in a smooth manner.

Also, the reflective layer preferably has a reflective portion at a portion other than the transmitting portion, wherein the transmitting portion is an opening provided to the reflective layer, and wherein the light color portion is disposed so as to overlay at least the reflective portion in planar fashion.

Further, the colored layer preferably has a laminated structure of the light color portion and the deep color portion. This structure can be configured simply by layering the light color portion and the deep color portion, and thus can be readily manufactured. In this case, either the light color portion or the deep color portion may be configured on top.

Now, the arrangement preferably further comprises a transmissive layer essentially capable of transmitting light, partially disposed between the reflective layer and the colored layer, wherein the deep color portion is disposed in a region where the transmissive layer is not disposed. Thus, a surface step can be provided between the light color portion and the deep color portion by presence or absence of the transmissive layer. Also, with a configuration wherein the surface step between the light color portion and the deep color portion is less than thickness of the partially disposed transmissive layer, a configuration can be made wherein the deep color portion is thicker than the light color portion. Accordingly, the saturation of the transmitted light can be raised even further.

At this time, the transmissive layer preferably has scattering functions for scattering light. Thus, blinding from illumination light or sunlight due to regular reflection of the reflective layer, picking up surrounding scenery, etc., can be reduced in cases of visually recognizing the reflective display through the color filter substrate. Now, scattering functions of the transmissive layer can be obtained by fine patterned indentations on the surface of the transmissive layer or fine particles dispersed and disposed within the transmissive layer.

Further, the arrangement preferably further comprises a foundation layer partially disposed between the reflective layer and the substrate, wherein the deep color portion is disposed in a region where the foundation layer is not disposed. Thus, a surface step can be provided between the light color portion and the deep color portion by presence or absence of the foundation layer. Also, with a configuration wherein the surface step between the light color portion and the deep color portion is less than thickness of the partially disposed foundation layer, a configuration can be made wherein the deep color portion is thicker than the light color portion. Accordingly, the saturation of the transmitted light can be raised even further.

At this time, the surface of the reflecting layer preferably has fine patterned indentations for scattering light. Thus, blinding from illumination light or sunlight due to regular reflection of the reflective layer, picking up surrounding scenery, etc., can be reduced in cases of visually recognizing the reflective display thorough the color filter substrate.

In the above means, the substrate preferably has a recessed portion, with the deep color portion disposed within the recessed portion. Due to the deep color portion being disposed within the recessed portion, a surface step can be provided between the light color portion and the deep color portion of the colored layer. Also, with a configuration wherein the surface step between the light color portion and the deep color portion is less than the depth of the recessed portion, a configuration can be made wherein the deep color portion is thicker than the light color portion. Accordingly, the saturation of the transmitted light can be raised even further.

Next, a color filter substrate according to the present invention comprises a colored layer disposed on a substrate and having a deep color portion, wherein the deep color portion has higher light density than other portions. The colored layer having a deep color portion enables the color of light passing through the deep color portion to be raised beyond the color of light transmitted through other portions. Accordingly, the color of the transmitted light can be improved over that of the conventional, by using this color filter substrate in a liquid crystal device comprising a reflective layer having a transmitting portion (opening) essentially transmitting light, to match the deep color portions to the transmitting portions. Now, the color filter substrate preferably has a deep color portion for each of multiple pixel regions.

Also, the arrangement preferably comprises a transmissive layer essentially capable of transmitting light, partially disposed between the substrate and the colored layer, wherein the deep color portion is disposed in a region where the transmissive layer is not disposed. According to this color filter substrate, a surface step can be provided between the light color portion and the deep color portion by presence or absence of the transmissive layer. Also, with a configuration wherein the surface step between the light color portion and the deep color portion is less than thickness of the partially disposed transmissive layer, a configuration can be made wherein the deep color portion is thicker than the light color portion. Accordingly, the saturation of the transmitted light can be raised even further.

Further, the substrate preferably has a recessed portion, with the deep color portion being disposed within the recessed portion. Due to the deep color portion being disposed within the recessed portion, a surface step can be provided between the light color portion and the deep color portion of the colored layer. Also, with a configuration wherein the surface step between the light color portion and the deep color portion is less than the depth of the recessed portion, a configuration can be made wherein the deep color portion is thicker than the light color portion. Accordingly, the saturation of the transmitted light can be raised even further.

Next, an Electro-optical device according to the present invention comprises: an Electro-optical layer containing Electro-optical material; a substrate for supporting the Electro-optical layer; a reflective layer disposed on the substrate, and having a transmitting portion essentially capable of transmitting light; and a colored layer disposed on the substrate, and having a light color portion, and a deep color portion with higher light density than the light color portion; wherein the deep color portion is disposed so as to overlay at least the transmitting portion in planar fashion.

According to the present invention, the deep color portion is disposed so as to overlay at least the transmitting portion of the reflective layer in planar fashion, whereby the light passing through the transmitting portion of the reflective layer is transmitted through the deep color portion, so the saturation of the transmitted light can be improved over the conventional.

Now, the light color portion is preferably disposed so as to overlay the reflective layer excluding the transmitting portion in a planar manner, with the deep color portion disposed on the region where the light color portion is not disposed. With this configuration, the light color portion and the deep color portion are formed on different planar regions, so the thickness of the color filter can be reduced, while the surface thereof can be configured in a smooth manner.

Further, the colored layer preferably has a laminated structure of the light color portion and the deep color portion. This structure can be configured simply by layering the light color portion and the deep color portion, and thus can be readily manufactured. In this case, either the light color portion or the deep color portion may be configured on top.

Now, the arrangement preferably further comprises a transmissive layer essentially capable of transmitting light, partially disposed between the reflective layer and the colored layer, wherein the deep color portion is disposed in a region where the transmissive layer is not disposed. Thus, a surface step can be provided between the light color portion and the deep color portion by presence or absence of the transmissive layer. Also, with a configuration wherein the surface step between the light color portion and the deep color portion is less than thickness of the partially disposed transmissive layer, a configuration can be made wherein the deep color portion is thicker than the light color portion. Accordingly, the saturation of the transmitted light can be raised even further.

At this time, the transmissive layer preferably has scattering functions for scattering light. Thus, blinding from illumination light or sunlight due to regular reflection of the reflective layer, picking up surrounding scenery, etc., can be reduced in cases of visually recognizing the reflective display through the color filter substrate. Now, scattering functions of the transmissive layer can be obtained by fine patterned indentations on the surface of the transmissive layer or fine particles dispersed and disposed within the transmissive layer.

Also, the arrangement preferably further comprises a foundation layer partially disposed between the reflective layer and the substrate, wherein the deep color portion is disposed on the substrate where the foundation layer is not disposed. Thus, a surface step can be provided between the light color portion and the deep color portion by presence or absence of the foundation layer. Also, with a configuration wherein the surface step between the light color portion and the deep color portion is less than thickness of the partially disposed foundation layer, a configuration can be made wherein the deep color portion is thicker than the light color portion. Accordingly, the saturation of the transmitted light can be raised even further.

Now, the surface of the reflecting layer preferably has fine patterned indentations for scattering light. Thus, blinding from illumination light or sunlight due to regular reflection of the reflective layer, picking up surrounding scenery, etc., can be reduced in cases of visually recognizing the reflective display.

Further, the substrate preferably has a recessed portion, with the deep color portion disposed within the recessed portion. Due to the deep color portion being disposed within the recessed portion, a surface step can be provided between the light color portion and the deep color portion of the colored layer. Also, with a configuration wherein the surface step between the light color portion and the deep color portion is less than the depth of the recessed portion, a configuration can be made wherein the deep color portion is thicker than the light color portion. Accordingly, the saturation of the transmitted light can be raised even further.

There are cases wherein the above Electro-optical devices comprise an opposing substrate disposed facing the substrate across the Electro-optical layer.

Also, another Electro-optical device according to the present invention comprises: an Electro-optical layer containing Electro-optical material; a first substrate for supporting the Electro-optical layer; a reflective layer disposed on the first substrate, and having a transmitting portion essentially capable of transmitting light; a second substrate disposed facing the first substrate; and a colored layer disposed on the second substrate, and having a light color portion, and a deep color portion with higher light density than the light color portion; wherein the deep color portion is disposed so as to overlay at least the transmitting portion in planar fashion.

According to the present invention, a reflective layer having a transmitting portion is disposed on the first substrate, a colored layer having a light color portion and a deep color portion is disposed on the second substrate, and the deep color portion is disposed so as to overlay at least the transmitting portion in planar fashion, whereby the light passing through the transmitting portion of the reflective layer is transmitted through the deep color portion, so the saturation of the transmitted light can be improved over the conventional.

Now, the arrangement preferably further comprises a transmissive layer essentially capable of transmitting light, partially disposed between the second substrate and the colored layer, wherein the deep color portion is disposed in a region where the transmissive layer is not disposed. Thus, a surface step can be provided between the light color portion and the deep color portion by presence or absence of the transmissive layer. Also, with a configuration wherein the surface step between the light color portion and the deep color portion is less than thickness of the partially disposed transmissive layer, a configuration can be made wherein the deep color portion is thicker than the light color portion. Accordingly, the saturation of the transmitted light can be raised even further.

Also, the second substrate preferably has a recessed portion, with the deep color portion disposed within the recessed portion. Due to the deep color portion being disposed within the recessed portion, a surface step can be provided between the light color portion and the deep color portion of the colored layer. Also, with a configuration wherein the surface step between the light color portion and the deep color portion is less than the depth of the recessed portion, a configuration can be made wherein the deep color portion is thicker than the light color portion. Accordingly, the saturation of the transmitted light can be raised even further.

Also, an arrangement may comprise a first substrate and a second substrate disposed on both sides of an Electro-optical layer containing Electro-optical material, wherein a colored layer is disposed on one or the other of the first substrate and the second substrate, and a restricted colored layer is disposed on the other substrate in a region overlaying the transmitting portion of the reflective layer in planar fashion. In this case, the light which has passed through the transmitting portion of the reflective layer is transmitted through the restricted color layer, so the saturation of the transmitted light can be improved. Here, the light density of the restricted colored layer is preferably higher than the colored layer.

Next, a manufacturing method for a color filter substrate according to the present invention comprises: a step for forming a light color portion of a colored layer on a first region; and a step for forming a deep color portion of a colored layer with higher light density than the light color portion, in a second region adjacent to the first region.

Next, a manufacturing method for an Electro-optical device according to the present invention comprises as a step thereof a manufacturing method for a color filter substrate, comprising: a step for forming a light color portion of a colored layer on a first region; and a step for forming a deep color portion of a colored layer with higher light density than the light color portion, in a second region adjacent to the first region.

Next, electronic equipment according to the present invention comprises an Electro-optical device comprising: an Electro-optical layer containing Electro-optical material; a substrate for supporting the Electro-optical layer; a reflective layer disposed on the substrate, and having a transmitting portion essentially capable of transmitting light; and a colored layer disposed on the substrate, and having a light color portion, and a deep color portion with higher light density than the light color portion; wherein the deep color portion is disposed so as to overlay at least the transmitting portion in planar fashion.

Also, other electronic equipment according to the present invention comprises an Electro-optical device comprising: an Electro-optical layer containing Electro-optical material; a first substrate for supporting the Electro-optical layer; a reflective layer disposed on the first substrate, and having a transmitting portion essentially capable of transmitting light; a second substrate disposed facing the first substrate; and a colored layer disposed on the second substrate, and having a light color portion, and a deep color portion with higher light density than the light color portion; wherein the deep color portion is disposed so as to overlay at least the transmitting portion in planar fashion.

BRIEF DESCRIPTION OF THE DRAWINGS

FIG. 20 is an enlarged partial cross-sectional diagram of a color filter substrate according to an Embodiment 2, and a plan view of the color filter, for illustrating a more specific structure.

BEST MODE FOR CARRYING OUT THE INVENTION

Figure 1:
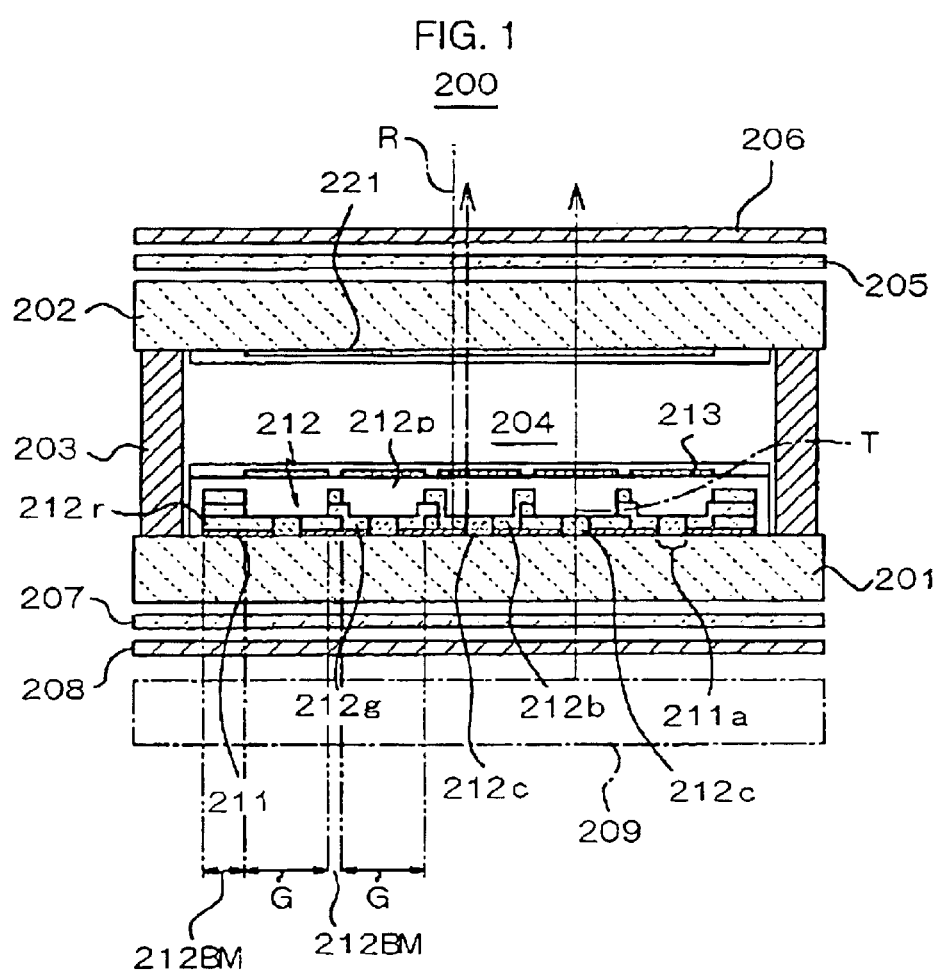
FIG. 1 is a schematic cross-sectional diagram illustrating the structure of a liquid crystal display panel according to a first embodiment of the present invention, in model fashion.

Next, embodiments of the color filter substrate and electro-optical device according to the present invention, and the manufacturing method thereof, will be described in detail, with reference to the attached drawings.
[First Embodiment]
FIG. 1 is a schematic cross-sectional diagram typically illustrating a substrate 201 which is a first embodiment of the color filter substrate according to the present invention, and a liquid crystal display panel 200 which is a first embodiment of the electro-optical device using the color filter substrate.

Figure 18:
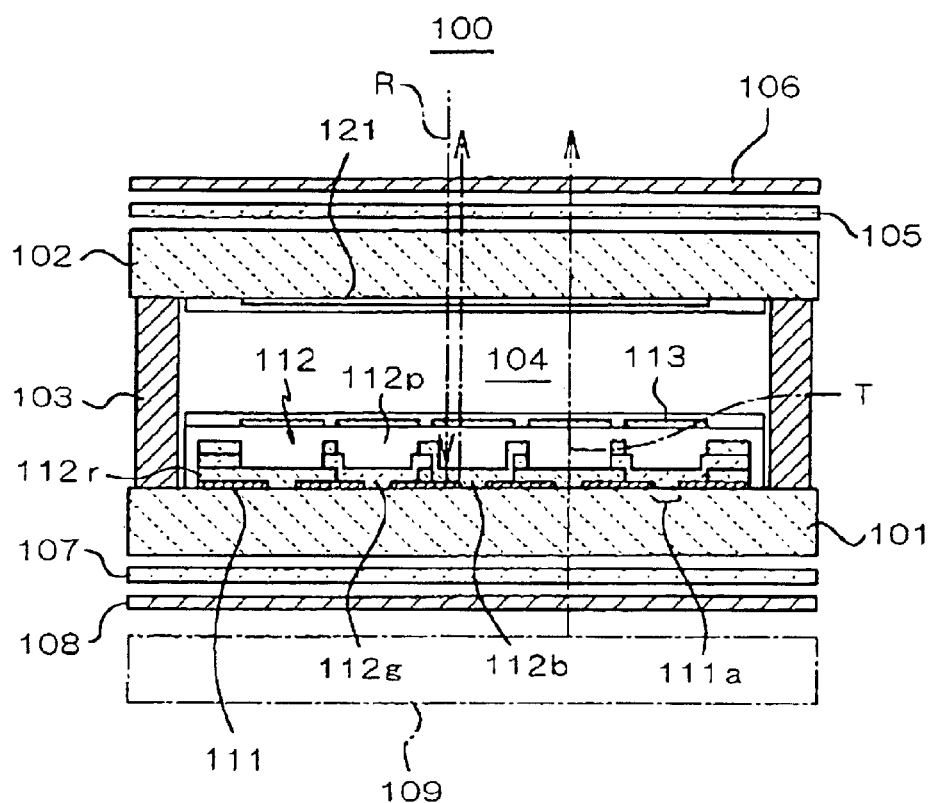
FIG. 18 is a schematic cross-sectional diagram illustrating the structure of a conventional transflective liquid crystal display panel, in model fashion.

This liquid crystal display panel 200 has a substrate 201 and a substrate 202 that are formed of glass or plastic or the like are bonded to each other with a seal member 203 interposed therebetween and liquid crystal 204 sealed inside. The substrate 202, the transparent electrodes 221 formed on the substrate 202, the retardation films 205 and 207, and the polarizing plates 206 and 208, are exactly the same as those in the above conventional example shown in FIG. 18.

The present embodiment has a reflective layer 211 having openings 211a which substantially allow light to pass through formed on the inner face of the substrate 201. This reflective layer 211 can be formed of a thin film such as aluminum, aluminum alloy, silver alloy, or the like. The openings 211a are formed at each pixel G arrayed and set vertically and horizontally in matrix fashion along the inner face of the substrate 210 so that a predetermined aperture ratio (e.g., 10 to 30%) can be achieved having the entire area of the pixels G as the reference.

Figure 9:
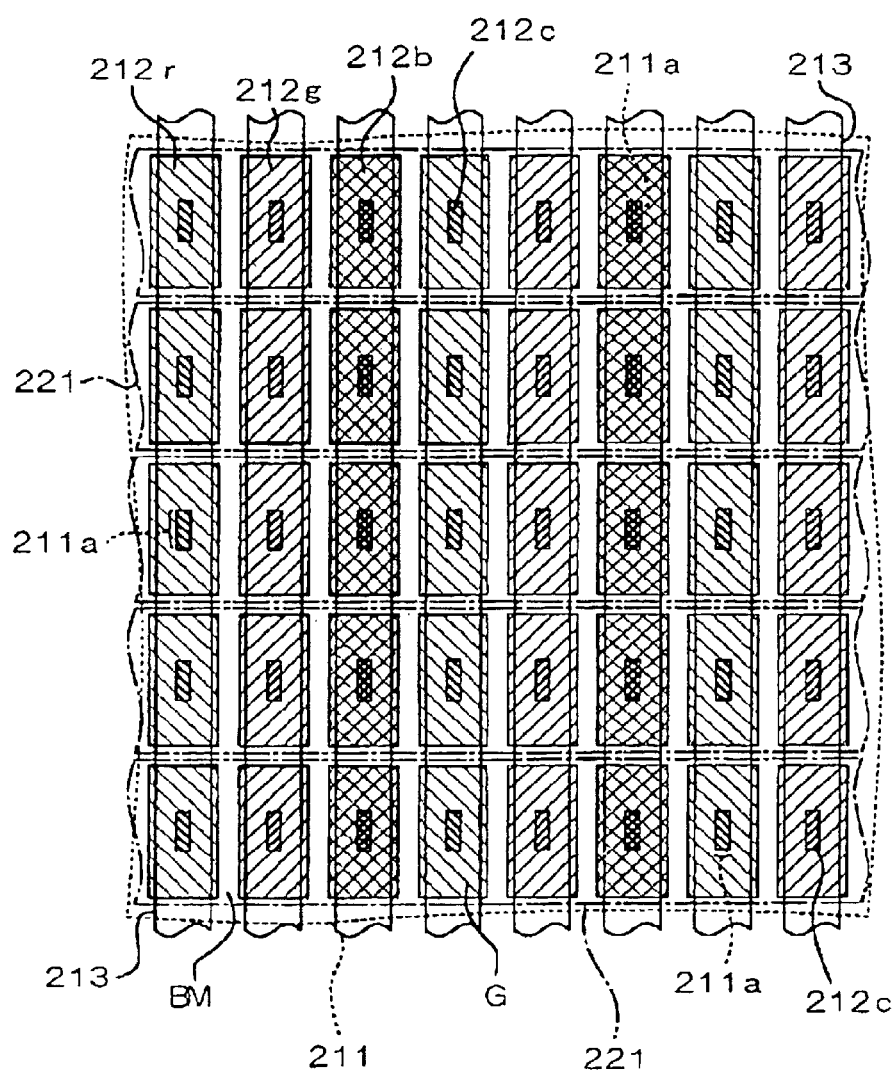
FIG. 9 is a schematic plan diagram illustrating the planar structure of a color filter substrate according to the first embodiment, in model fashion.

FIG. 9 is a plan view of the substrate 201 when viewed from above. The openings 211a are formed in a rectangular form in a plan view as indicated by the dotted leader lines in FIG. 9 for example, and one opening is formed for each pixel G substantially at the center of the pixel G. However, the position and opening forms of the openings 211a may be arbitrarily decided, and the number of the openings 211a may also be arbitrarily decided, so multiple openings may be provided for each pixel, unlike with the present embodiment.

In the event of a primary color type color filter for example, on the reflective layer 211 are formed colored layers 212r, 212g, and 212b, of the three colors R (red), G (green), and B (blue), for each pixel G with a suitable array form (FIG. 9 shows a color filter with a stripe array) such as, for example, a known stripe array, delta (triangle) array, diagonal mosaic (diagonal) array, etc. Now, an overlaying shielding portion 212BM is formed between the pixels G, wherein the colored layers 212r, 212g, and 212b overlap one another to exhibit shielding properties. Now, the surface of the colored layers 212r, 212g, and 212b is basically formed flat, except for the overlaying shielding portion 212BM.

Deep color portions 212c are provided to the openings 211a of the reflective layer 211 for the colored layers 212r, 212g, and 212b, with the portions other than the deep color portions 212c being light-colored light color portions with smaller light density than the deep color portions 212c. The deep color portions 212c which have high light density are formed such that the density of coloring materials such as pigment or dye or the like dispersed within the transmissive resin for example, is higher than the density within the light color portions.

A protective film 212p formed of transparent resin or the like is formed upon the colored layers 212r, 212g, and 212b, and the overlaying shielding portion 212BM. This protective film 212p protects the colored layers from corrosion and contamination caused by chemicals and the like in processing, and also levels the surface of the color filter 212.

Transparent electrodes 213 formed of a transparent conductive material such as ITO (Indium-Tin Oxide) or the like are formed on the color filter 212. In the present embodiment, the transparent electrodes 213 are formed in the shape of multiple parallel stripes. Also, the transparent electrodes 231 extend in a direction orthogonal to the transparent electrodes 221 formed on similar stripe fashion on the substrate 202, such that the components of the liquid crystal display panel 200 (the reflective layer 211, color filter 212, transparent electrode 213, and the liquid crystal 204 and the part of the transparent electrode 221 in the above intersecting region) contained in the intersection region between the transparent electrodes 213 and the transparent electrodes 221 (indicated by the dashed line in FIG. 9) make up the pixel G In the present embodiment, due to the deep-colored deep color portions 212c having higher light density than the other portions being formed above the openings 211a of the reflective layer 211 in the colored layer 212, the saturation of the light passing through the deep color portions 212c of the colored layers 212r, 212g, and 212b is raised, and the saturation of the light passing through the other light color portions is relatively lower.

In this liquid crystal panel display 200, light passes through the reflective path R in the event that reflective display is to be made and is visually recognized, and light passes through the transmissive path T in the event that transmissive display is to be made and is visually recognized. At this time, the color filter 212 operates in the same manner in the reflective path T as with conventional arrangements, but the transmissive path T passes through the opening 211a of the reflective layer 211, so the transmitted light passes through the deep color portions 212c of the colored layers 212r, 212g, and 212b, and consequently, the saturation in transmissive display improves over the conventional structure shown in FIG. 18.

Accordingly, in the present embodiment, due to forming the deep color portions 212c at the positions on the color filter 212 overlapping the openings 211a of the reflective layer 211, the saturation of transmissive display can be improved without sacrificing brightness of reflective display. Particularly, the difference in saturation between reflective display and transmissive display can be further reduced as compared to the prior art.

Now, with the deep color portions 212c, in the event that the thickness is the same between the deep color portions 212c and other light color portions, the arrangement is preferable such that obtained saturation is substantially equal when the same light is transmitted through the deep color portions and light color portions having a thickness that is twice the thickness of the deep color portions. Herein, let us assume that the color density of the deep color portions 212c is twice the color density of the light color portions. Using the expression of this color density, more specifically, the color density of the deep color portions is preferably within the range of 1.4 times to 2.6 times that of the light color portions, and preferably within 1.7 times to 2.3 times. Thus, the difference between the saturation of reflective display and the saturation of transmissive display can be reduced, and the difference in color between both displays can be further reduced. Also, within the above range, the concentration of pigment or dye can be adjusted, which allows a color filter to be easily manufactured.

Also, in the present embodiment, due to the light color portions and deep color portions 212c being arrayed on the colored layers 212r, 212g, and 212b in planar fashion, the irregularities on the surface of the colored layers 212r, 212g, and 212b (upper face in the drawings) can be reduced, and particularly, the colored layer can be formed flat by the light color portions and deep color portions being made having the same thickness. Accordingly, the flatness of the surface of the color filter 212 can be improved, so the display quality of the liquid crystal display panel can be improved.

Note that the openings of the reflective layer are not restricted to cases of being actual openings, rather, transmissive portions formed so as to be capable of substantially transmitting light is sufficient. For example, this also includes cases in which an arrangement is made such that light can substantially be transmitted, by forming a part of the reflective layer thinner.

[Second Embodiment]

Next, a color filter substrate 301 and a liquid crystal display panel 300 according to a second embodiment of the present invention will be described with reference to FIG. 2. This embodiment comprises substrates 301 and 302, a seal member 303, liquid crystal 304, transparent electrodes 313 and 321, retardation films 305 and 307, and polarizing plates 306 and 308, in the same manner as in the first embodiment, so description thereof will be omitted.

In the present embodiment, a reflective layer 311 having openings 311a as transmissive portions capable of substantially transmitting light is provided on the surface of the substrate 301, and the colored layers 312r, 312g, and 312b are formed for each pixel on the reflective layer 311. The colored layers are formed for all of the pixels, so as to cover the openings 311a as well. The colored layers consist of light color portions formed over the entirety of pixels on the reflective layer 311, and deep color portions 312c having color density higher than the light color portions with the same hue, with the deep color portions being layered on the light color portions.

In the present embodiment, the colored layers 312r, 312g, and 312b are formed of a layered structure of the light color portions and the deep color portions 312c, so light only passes through the light color portions in the reflective path R as in the first embodiment, but light is transmitted through both the light color portions and the deep color portions 312c in the transmissive path T, unlike the first embodiment. Accordingly, the saturation of transmissive display improves in the same way as in the first embodiment, and the difference in saturation between reflective display and transmissive display can be reduced. In this case, it is formed so that the transmitted light passes through both the light color portions and the deep color portions, so in the present embodiment, the thickness of the deep color portions 312c can be reduced as compared to the thickness of the deep color portions of the first embodiment. For example, in the event that the light density of the deep color portions is twice that of the light color portions, the thickness of the deep color portions 312c can be made to be half of the light color portions in order to obtain optical properties equivalent to the first embodiment with the present embodiment.

[Third Embodiment]

Figure 3:
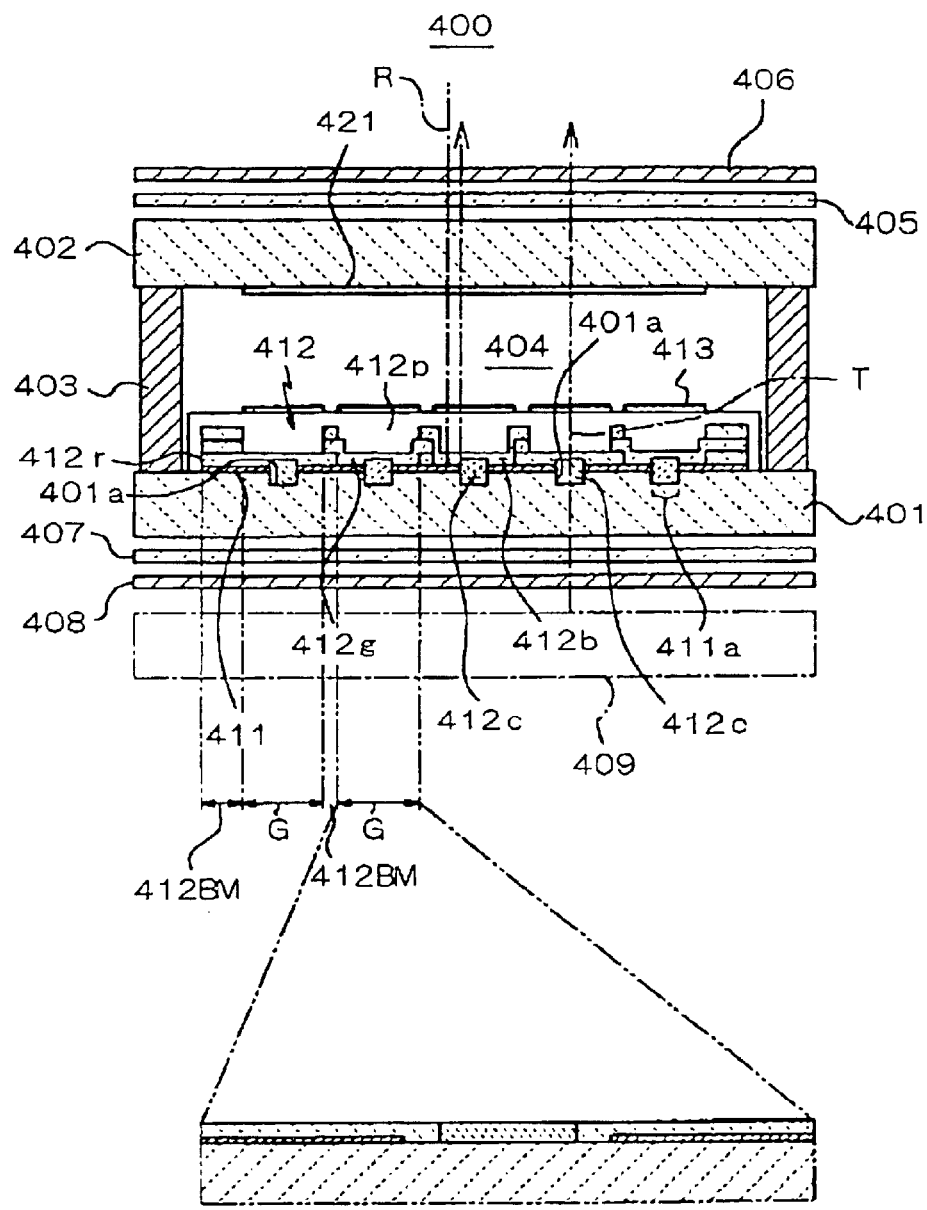
FIG. 3 is a schematic cross-sectional diagram illustrating the structure of a liquid crystal display panel according to a third embodiment of the present invention, in model fashion.

Next, the color filter substrate 401 and liquid crystal display panel 400 according to the third embodiment of the present invention will be described with reference to FIG. 3. This embodiment also comprises substrates 401 and 402, a seal member 403, liquid crystal 404, transparent electrodes 413 and 421, retardation films 405 and 407, and polarizing plates 406 and 408, arranged in the same manner as in the first embodiment, so description thereof will be omitted.

Also, as in the above embodiment, the present embodiment also has a reflective layer 411 having openings 411a as transmissive portions capable of substantially transmitting light provided on the surface of the substrate 401, and a color filter 412 formed of colored layers 412r, 412g, and 412b, and an overlaying shielding portion 412BM and protective film 412p is formed directly thereupon.

In this embodiment, recessed portions 401a are formed for each pixel on the substrate 401, and the recessed portions 401a are configured they substantially match the openings 411a of the reflective layer 411 in terms of position and form. Deep color portions 412c making up a part of the colored portions are formed within the recessed portions 401a, and light-colored light color portions with smaller light density than the deep color portions are formed over the deep color portions 412c, on the entirety of the pixels.

In this embodiment as well, the colored layers 412r, 412g, and 412b have a laminated structure of light color portions and deep color portions, thereby exhibiting the same optical advantages as in the second embodiment. However, in the present embodiment, since recessed portions 401a are formed on the substrate 401 and the deep color portions 412c are formed within the recessed portions 401a, the flatness of the surface of the colored layer can be improved over that in the second embodiment.

[Fourth Embodiment]

Figure 4:
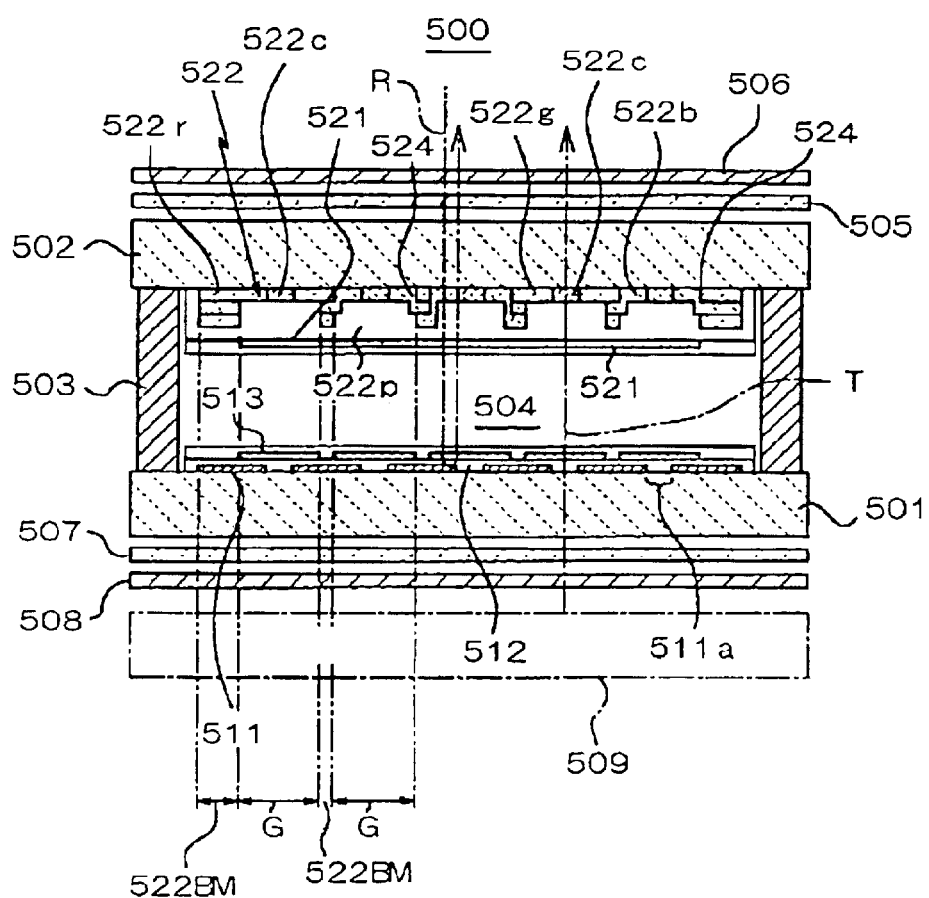
FIG. 4 is a schematic cross-sectional diagram illustrating the structure of a liquid crystal display panel according to a fourth embodiment of the present invention, in model fashion.

Next, the color filter substrate 501 and liquid crystal display panel 500 according to the fourth embodiment of the present invention will be described with reference to FIG. 4. This embodiment also comprises substrates 501 and 502, a seal member 503, liquid crystal 504, transparent electrodes 513 and 521, retardation films 505 and 507, and polarizing plates 506 and 508, arranged in the same manner as in the first embodiment, so description thereof will be omitted.

In the present embodiment, unlike the arrangement wherein the color filter is formed on a substrate comprising a reflective layer as in the first through third embodiments, the color filter 522 is formed on the substrate 502 facing the substrate 501 instead of having a color filter formed on the substrate 501 having the reflective layer 511.

A reflective layer 511 having openings 511a serving as transmitting portions capable of substantially transmitting light is formed on the substrate 501 in the same way as the above embodiments, a transparent insulating film 512 is formed on the reflective layer 511, and transparent electrodes 513 are formed on the insulating film 512.

On the other hand, colored layers 522r, 522g, and 522b are formed on the substrate 502, and portions overlaying the openings 511a of the reflective layer 511 on the colored layers are deep color portions 522c with higher light density than the other portions. Overlaying shielding portions 522BM and a protective film 522p are then formed over the colored layer, thus forming a color filter 522.

In the present embodiment, light passing through the reflective path R passes through the light color portions in the colored layer twice, and light passing through the transmissive path T passes through the deep color portions 552c, thereby yielding the same optical advantages as with the first embodiment.

The color filter substrate for this embodiment is the substrate 502, and unlike the preceding embodiments, the reflective layer is not formed on the substrate 502. That is to say, the color filter substrate according to the present embodiment is formed as a substrate opposing the substrate 501 upon which the reflective layer is formed, and the properties relating to color of the transflective liquid crystal display panel can be improved by providing deep color portions at a part of the colored layer provided for each pixel, with such a color filter substrate not having a reflective layer, as well.

Now, in the present embodiment, a color filter 522 having the same structure as the first embodiment is formed on the substrate 502 facing the substrate 501 upon which the reflective layer 511 is formed, but the structure of the color filter 522 may be a structure wherein deep color portions are overlaid on the light color portions as in the second embodiment, or may be a structure wherein light color portions are overlaid on deep color portions, particularly wherein recessed portions are provided on the substrate 502 and the deep color portions are formed within the recessed portions, as in the third embodiment.

[Fifth Embodiment]

Figure 5:
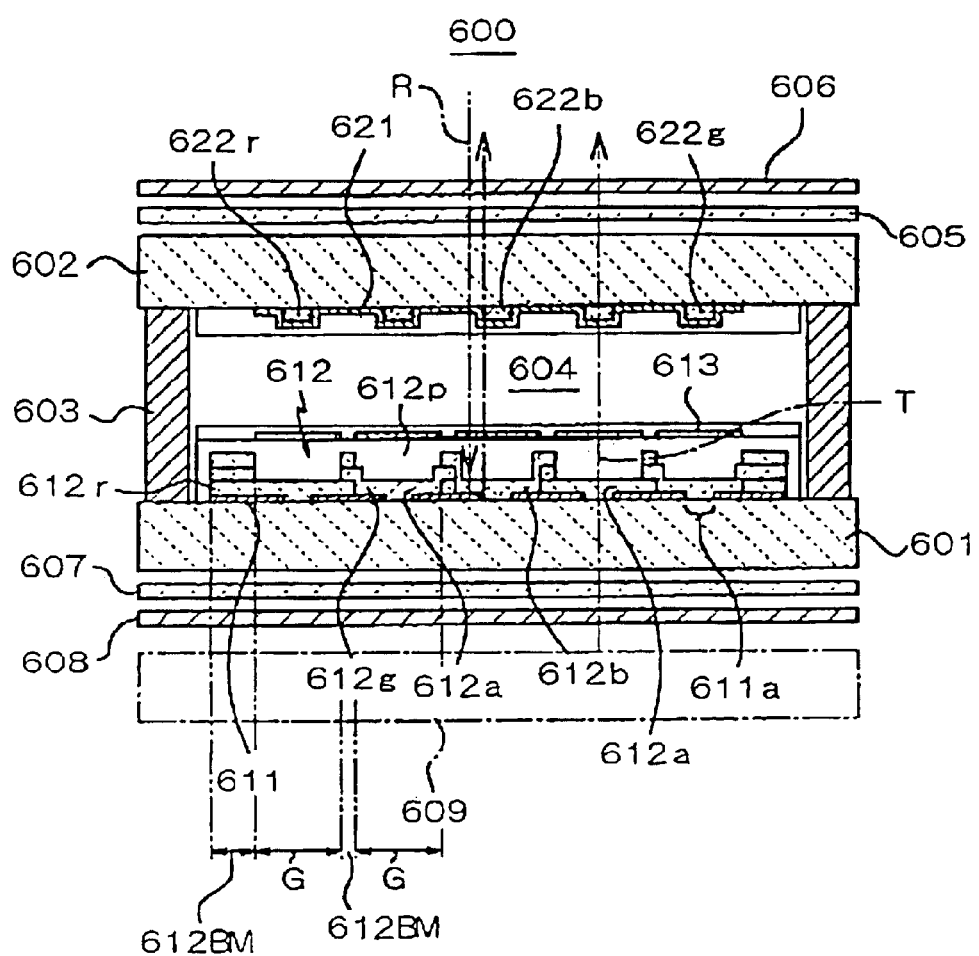
FIG. 5 is a schematic cross-sectional diagram illustrating the structure of a liquid crystal display panel according to a fifth embodiment of the present invention, in model fashion.

Next, the color filter substrate and electro-optical device according to the fifth embodiment of the present invention will be described with reference to FIG. 5. FIG. 5 is a schematic cross-sectional diagram typically illustrating the structure of the liquid crystal display panel 600 of the present embodiment.

The liquid crystal display panel 600 comprises substrates 601 and 602, a seal member 603, liquid crystal 604, transparent electrodes 613 and 621, retardation films 605 and 607, and polarizing plates 606 and 608, arranged in the same manner as in the first embodiment, so description thereof will be omitted.

Also, as in the first embodiment, a reflective layer 611 having openings 611a serving as transmitting portions capable of substantially transmitting light is formed on the surface of the substrate 601, and a color filter 612 is formed on the reflective layer 611. In the present embodiment the color filter 612 comprises colored layers 612r, 612g, and 612b with a uniform color density, and an overlaying shielding portion 612BM and protective film 612p.

On the other hand, deep color layers 622r, 622g, and 622b, are formed on the substrate 602 restricted to positions overlaying the openings 611a of the reflective layer 611, with transparent electrodes 621 formed on the deep color layers 622r, 622g, and 622b. The deep color layers 622r, 622g, and 622b have higher color density than the color density of the colored layers 612r, 612g, and 612b.

In the present embodiment, light passing through the reflective path R passes through the colored layer on the substrate 601 twice without being transmitted through the deep color layers formed on the restricted ranges, but the light passing through the transmissive path T is transmitted through the colored layer and further is transmitted through the deep color layer. Accordingly, the saturation of transmissive display can be increased as compared to a liquid crystal display panel with the conventional structure shown in FIG. 18, and the difference in saturation between reflective display and transmissive display can be reduced.

Now, in the present embodiment, the colored layer on the substrate 601 is formed on the entirety of pixels, and the deep color layer on the substrate 602 is formed in a range restricted to overlaying the openings 611a of the reflective layer 611 in planar fashion, or other arrangement may be made other wise wherein the colored layer on the substrate 601 avoids the portions of the openings 611a of the reflective layer 611. Also, although the light-colored colored layer is formed on the substrate 601 upon which the reflective layer 611 is formed, but conversely, the deep color layer may be formed on the substrate where the reflective layer is formed, with the light-colored colored layer being formed on the other substrate.

[Sixth Embodiment]

Figure 6:
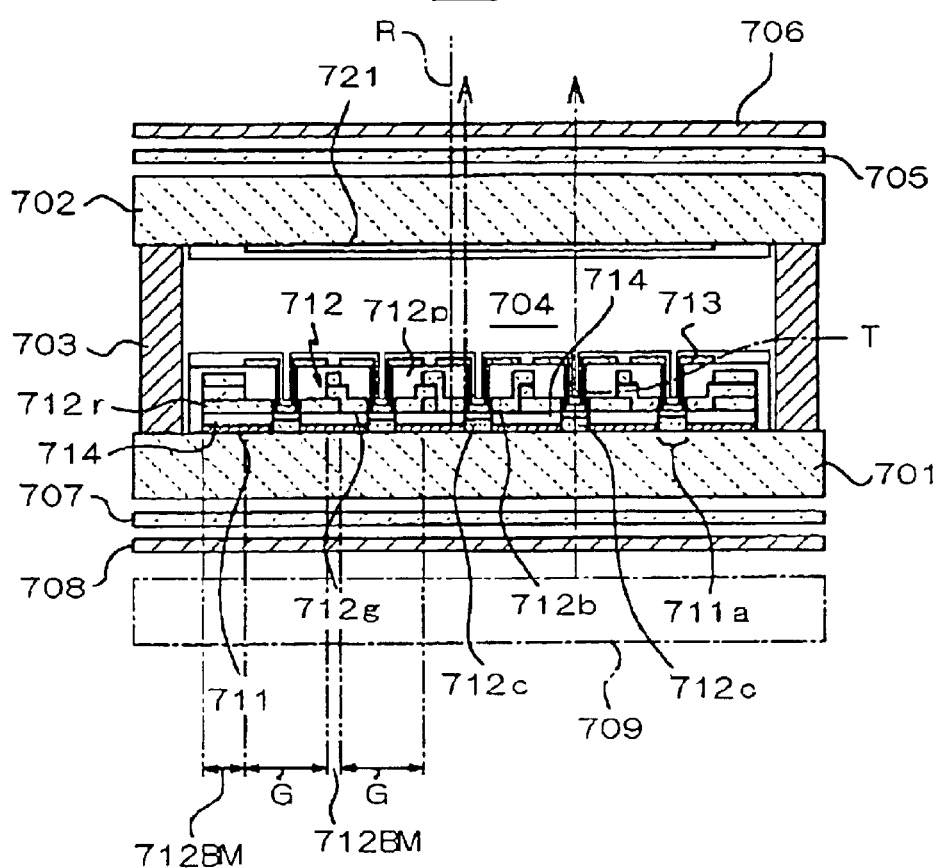
FIG. 6 is a schematic cross-sectional diagram illustrating the structure of a liquid crystal display panel according to a sixth embodiment of the present invention, in model fashion.

Next, a liquid crystal display panel 700 according to the sixth embodiment of the present invention will be described with reference to FIG. 6. This embodiment comprises the substrates 701 and 702, seal member 703, liquid crystal 704, retardation films 705 and 707, polarizing plates 706 and 708, a reflective layer 711 having openings 711a, and the color filter 712 having colored layers 712r, 712g, and 712b, as in the liquid crystal display panel 100 of the conventional structure shown in FIG. 18.

In the present embodiment, a reflective layer 711 having openings 711a serving as transmitting portions capable of substantially transmitting light for each pixel is formed on the substrate 701, and a transmissive layer 714 is partially formed on the reflective layer 711 so as to avoid the openings 711a. The transmissive layer 714 can be formed of inorganic materials such as $SiO_2$, $TiO_2$, or resins such as acrylic resin or epoxy resin or the like, and it is sufficient to have transmissivity in the visible light range, and particularly preferabe to be transparent to visible light rays, for example, having average transmissivity of 70% or more in the visible light range and has little wavelength dispersion (e.g., transmissivity fluctuation of 10% or less).

Also, the openings 711a which are non-formation regions of the transmissive layer 714 have the deep color portions 752c formed directly on the substrate 701. Also, light color portions with light density lower than the deep color portions 712c are formed on the transmissive layer 714, with the colored layers 712r, 712g, and 712b being formed of the deep color portions 712c and the light color portions.

In the present embodiment, a step is formed between the deep color portions 712c and the light color portions, due to the transmissive layer 714 having been formed, and accordingly, the liquid crystal 704 is thick at regions which overlay in planar fashion the openings 711a of the reflective layer 711 within the pixels, and the liquid crystal 704 is thin at regions other than the regions overlaying in planar fashion the openings 711a. Accordingly, transmissive display can be made brighter than cases wherein the thickness of the liquid crystal 704 is approximately the same at regions overlaying the openings of the reflective layer and other regions, as in the first through fifth embodiments. Now, a arrangement wherein the liquid crystal thickness at regions which overlay in planar fashion the openings of the reflective layer is approximately twice the liquid crystal thickness at other regions, is preferable.

Figure 16:
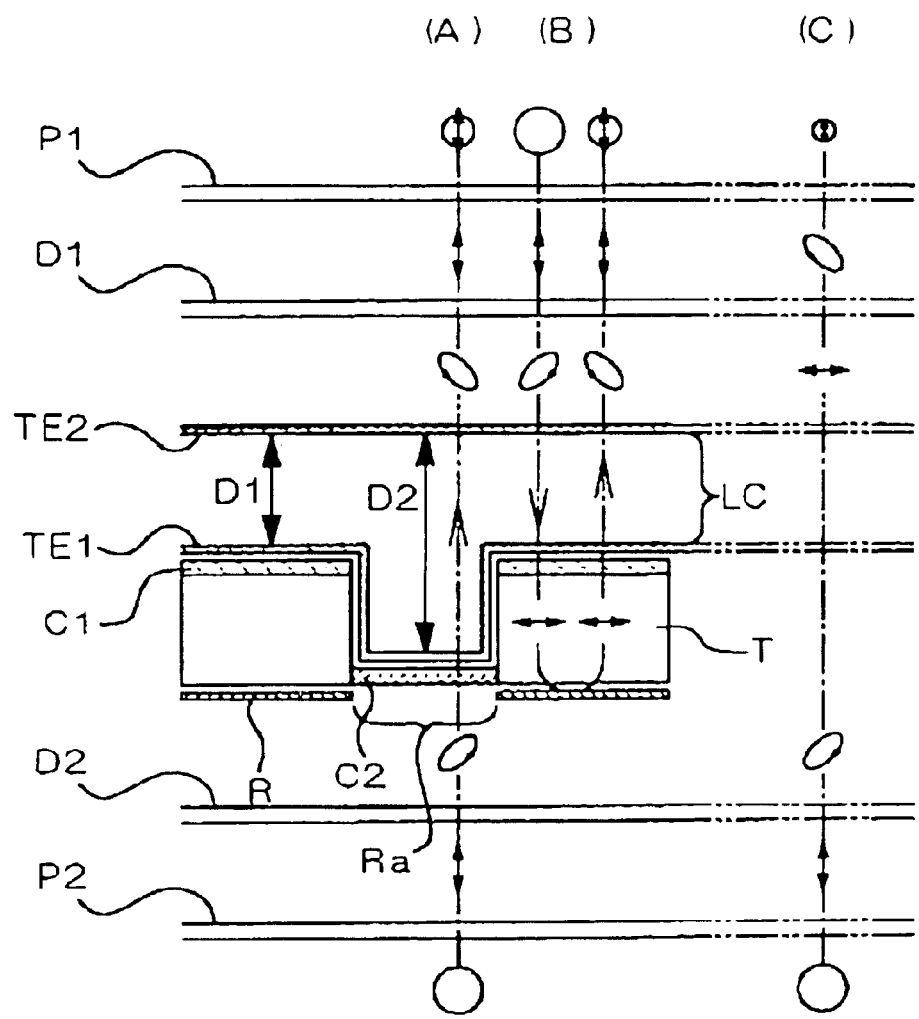
FIG. 16 is an explanatory diagram for describing the optical functions of a liquid crystal display panel according to the present invention.

FIG. 16 is an explanatory diagram for describing the advantages of changing the thickness of the liquid crystal as described above. As shown above, a transmissive layer T is formed on a reflective layer R, with a light color portion C1 formed thereupon, while a deep color portion C2 is directly formed on openings Ra of the reflective layer, whereby the liquid crystal thickness D2 of the regions overlapping in planar fashion the openings Ra are made to be twice the liquid crystal thickness D1 at other regions. Now, for the sake of description, let us assume that homogeneous liquid crystal cells are formed. Also, let us assume that the retardation of the liquid crystal cells is $\Delta n \cdot D1 = \lambda/4$, $\Delta n \cdot D2 = \lambda/2$ (wherein $\Delta n$ is the optical anisotropy of the liquid crystal, and X is the wavelength of the light).

In the above state, in the event that the liquid crystal cells are in a transmissive state, in transmissive display, as shown in FIG. 16(A), the illumination light from a back-light or the like passes through a polarizing plate P2 and becomes linearly polarized light, passes through a retardation film (¼ wavelength plate) to become circularly polarized light of right-hand rotation for example, and then passes through a liquid crystal layer with cell thickness of D2 wherein the phase difference further processes ½ wavelength to become circularly polarized light of left-hand rotation, passes through the retardation film D1 to become linearly polarized light, and passes through the polarizing plate P1.

Also, in the event that the liquid crystal cells are in the transmissive state as the above, in reflective display, as shown in FIG. 16(B), external light passes through the polarizing plate P1 and becomes linearly polarized light, passes through a retardation film (¼ wavelength plate) D1 to become circularly polarized light of right-hand rotation for example, passes through the liquid crystal layer with cell thickness of D2 twice, coming and going, wherein the phase difference further processes ½ wavelength to become circularly polarized light of left-hand rotation, passes through the retardation film D1 again to return to the linearly polarized light, and passes through the polarizing plate P1.

In the transmissive display, as shown in FIG. 16(C), assuming that the thickness of the liquid crystal through which transmission is made is D1, then the retardation is $\lambda/4$, so the polarization state following the illumination light passing through the liquid crystal via the polarization plate P2 and the retardation film D2 is linearly polarized light in a direction orthogonal to the original direction, subsequently passes through the retardation film D1 to become circularly polarized light of left-hand rotation, and further passes through the polarization plate P1. At this time, the polarization component which can pass through the polarization plate P1 is approximately half of the quantity of light in comparison with a case wherein the thickness of the liquid crystal is D2.

As described above, in the case of a transflective liquid crystal panel in the present embodiment, in the event that the thickness of the liquid crystal at regions overlaying in planar fashion the openings of the reflective layer is thicker than the thickness of liquid crystal at other regions, the amount of light transmission in the transmissive state increases, and particularly, in the event that the thickness of the liquid crystal at regions overlaying the openings in planar fashion is as twice as thick as the thickness of liquid crystal at other regions, the amount of light transmission is also substantially doubled. In the event that the liquid crystal cells are not homogeneous and twisting exists in the liquid crystal layer, there are cases wherein the transmissivity does not increase, but with 40° twisted liquid crystal for example, improvement in transmissivity by around 40% can be obtained by making the thickness of the liquid crystal at regions overlaying in planar fashion the openings to be twice that at other regions.

[Seventh Embodiment]

Figure 7:
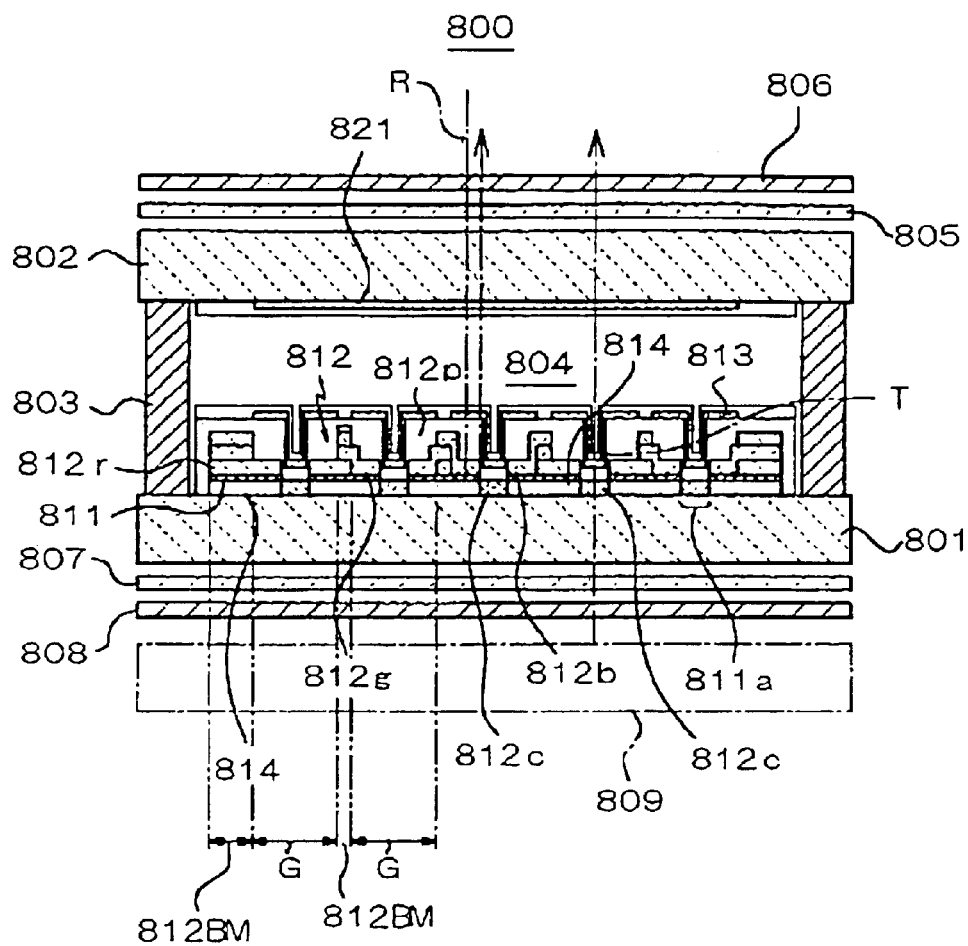
FIG. 7 is a schematic cross-sectional diagram illustrating the structure of a liquid crystal display panel according to a seventh embodiment of the present invention, in model fashion.

Next, a liquid crystal display panel 800 according to the seventh embodiment of the present invention will be described with reference to FIG. 7. This embodiment comprises the substrates 801 and 802, seal member 803, liquid crystal 804, retardation films 805 and 807, polarizing plates 806 and 808, a reflective layer 811 having openings 811a, and the color filter 812 having colored layers 812r, 812g, and 812b, as in the liquid crystal display panel 100 of the conventional structure shown in FIG. 18.

In this embodiment, a foundation layer 814 is partially formed on the substrate 801, and a reflective layer 811 is formed on the foundation layer 814. Now, the reflective layer 811 has openings 811a serving as transmitting portions which substantially allow light to pass through for each pixel, these openings 811a being formed corresponding to non-formation regions of the foundation layer 814. Deep color portions 812c are formed on the substrate 801 in the non-formation regions of the foundation layer 814. Also, light color portions with smaller light density than the deep color portions 812c are formed on the reflective layer 811, with the colored layers 812r, 812g, and 812b being formed of the light color portions and the deep color portions 812c.

In the present embodiment, the foundation layer 814 may be formed with the same material as the transmissive layer in the sixth embodiment, but does not necessarily need to have transmissivity, and may be formed with a material having light shielding properties.

As in the sixth embodiment, the present embodiment is also arranged such that the liquid crystal 804 is thick at regions overlapping in planar fashion the openings 811a of the reflective layer 811, and such that the liquid crystal 804 is thin at other regions.

[Eighth Embodiment]

Figure 8:
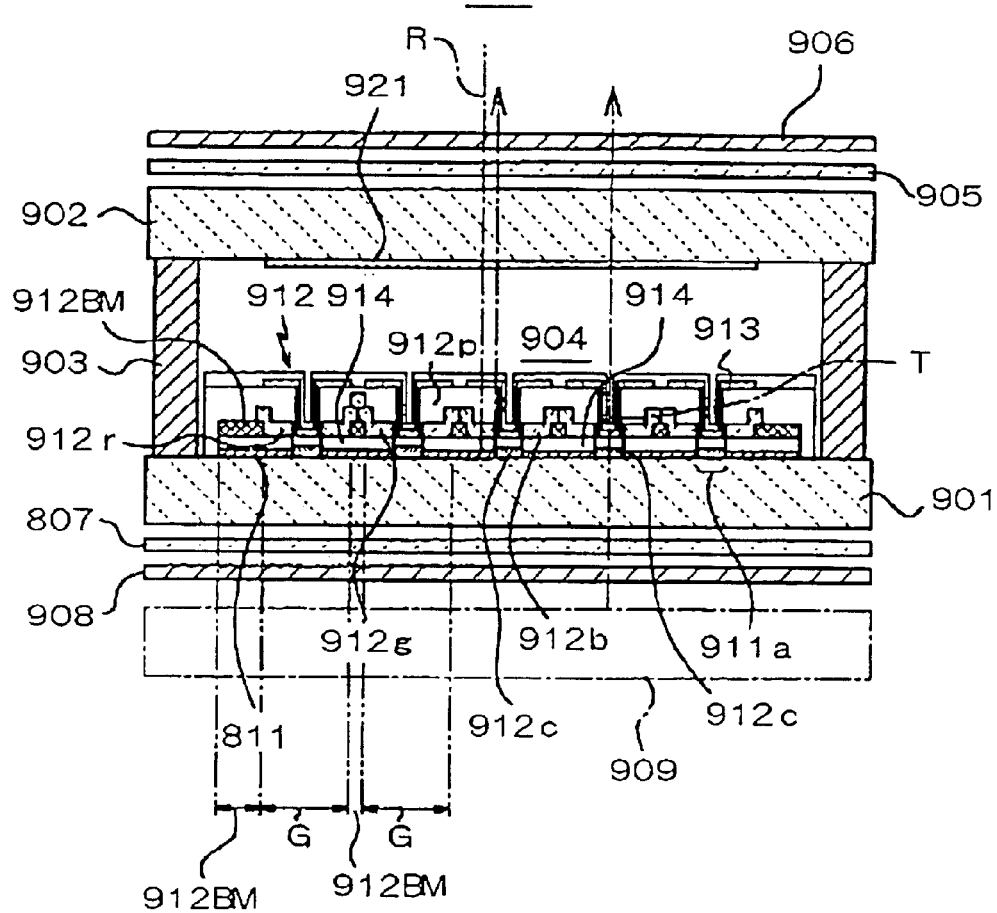
FIG. 8 is a schematic cross-sectional diagram illustrating the structure of a liquid crystal display panel according to an eighth embodiment of the present invention, in model fashion.

Next, a liquid crystal display panel 900 according to the eighth embodiment of the present invention will be described with reference to FIG. 8. This embodiment comprises substrates 901 and 902, seal member 903, liquid crystal 904, retardation films 905 and 907, polarizing plates 906 and 908, reflective layer 911 having openings 911a, and color filter 912 having colored layers 912r, 912g, and 912b, as in the liquid crystal display panel 100 of the conventional structure shown in FIG. 18.

As in the sixth embodiment, in the present embodiment, a reflective layer 911 having openings 911a serving as transmitting portions capable of substantially transmitting light is formed on the substrate 901, a transmissive layer 914 is partially formed on this reflective layer 911 so as to avoid the openings 911a, deep color portions 912c are formed on the substrate 901 at the formation regions of the openings 911a, and light color portions are formed on the transmissive layer 914, so that colored layers 912r, 912g, and 912b are formed of the deep color portions 912c and the light color portions.

In the present embodiment, a black shielding layer 912BM is formed at the inter-pixel regions on the transmissive layer 914 instead of the overlaying shielding layer in the above embodiments. A black resin material, for example, one with black pigment dispersed in resin, or the like, can be used for the black shielding layer 612BM. The colored layers 912r, 912g, and 912b are sequentially formed on the black shielding layer 912BM, and a protective film 912p is formed thereupon, thereby forming the color filter 912. The colored layers are each formed so that the perimeters thereof are overlaid on the black shielding layer 912BM.

In the present embodiment, a separate step for forming the black shielding layer 612BM becomes necessary, but the thickness of the color filter can be reduced as compared with cases wherein the overlaying shielding layer is used, and moreover, the flatness of the surface of the color filter can be improved.

[Ninth Embodiment]

Figure 10:
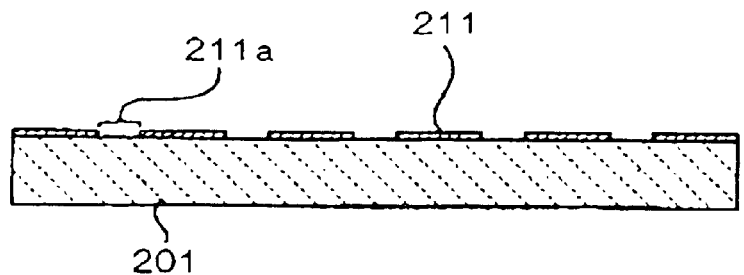
FIG. 10 is schematic process drawings (a) through (d) illustrating the manufacturing method of a color filter substrate according to a ninth embodiment of the present invention, in model fashion.
Figure 10:
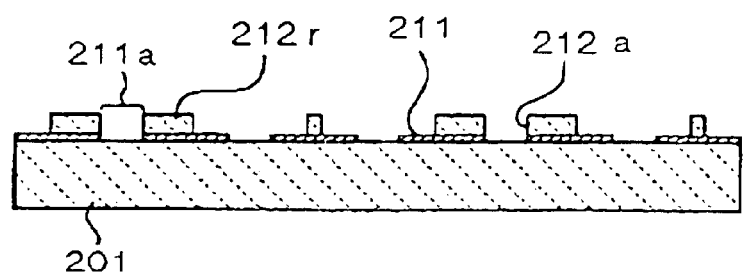
Figure 10:
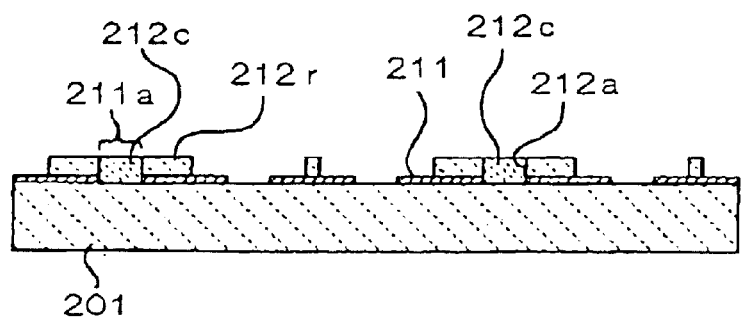
Figure 10:
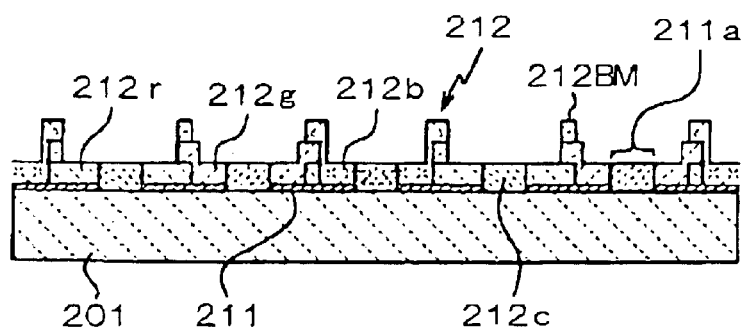

Next, the method for manufacturing a color filter substrate as a ninth embodiment according to the present invention will be described with reference to FIG. 10. This method for manufacturing a color filter relates to the method for manufacturing a color filter substrate used in the liquid crystal display panel 200 according to the first embodiment.

A thin film formed of metals such as aluminum, aluminum alloy, silver alloy, chromium, etc., is formed on the surface of the substrate 201, by vapor deposition or sputtering or the like, and this is patterned with known photo-lithography, to form a reflective layer 211 having openings 211a, as shown in FIG. 10(a).

Next, as shown in FIG. 10(b), a photosensitive resin (photosensitive resist) having pigment or dye or the like exhibiting a predetermined hue dispersed therein is coated, and patterning is performed by exposing and developing with a predetermined pattern, thereby forming the light color portions of the colored layer 212r. The light color portions have a pattern comprising non-formation regions (openings) at portions above the openings 211a of the reflective layer 211. Subsequently, photosensitive resin with a higher concentration of pigment or dye or the like than the light color portions is coated, and patterned in the same way as above, thereby forming the deep color portions 212c at the non-formation regions of the light color portions, as shown in FIG. 10(c). Then, the colored layers of each of the colors are sequentially formed having deep color portions 212c as shown in FIG. 10(d), by repeating the same steps as above with the colored portions 212g and 212b of the other hues. Here, patterning is performed for the colored layers so as to mutually be overlaid in the inter-pixel areas, thereby forming an overlaying shielding layer 212BM where multiple colored layers (three in the example in the drawing) are overlain.

Note that as for procedures for forming the colored layers, the light color portions may be formed after forming the deep color portions 212c, opposite to that described above. Also, with regard to the colored layers of multiple hues, the light color portions may be sequentially formed following which the deep color portions are formed, or conversely, the deep color portions may be sequentially formed following which the light color portions are formed.

In the colored layer forming step, a material with high leveling properties are used as the photosensitive resin, and the material is applied using a method whereby flatness is readily obtained, such as spin coating or the like. As a result, the surface of the colored layers are formed practically flat within the pixel.

The color filter substrate thus formed has a substantially flat surface by an unshown protective layer 212p being formed. Subsequently, the liquid crystal display panel 200 shown in FIG. 1 is formed using the substrate 201 which is this color filter substrate.

With regard to manufacturing of the liquid crystal display panel 200 shown in FIG. 1, a transparent electro-conductive material is coated by sputtering on the color filter 212 formed on the substrate 201 as described above, and transparent electrodes 213 are formed by patterning using known photo-lithography. Subsequently, an alignment layer of polyimide resin or the like is formed on the transparent electrodes 213, and subjected to rubbing processing and the like.

Next, the substrate 201 and substrate 202 are adhered one to another by a seal material 203, thereby forming a panel structure. At this time, transparent electrodes 221 and an alignment layer that is similar to the above are already formed on the surface of the substrate 202. The substrate 201 and substrate 202 are bonded to each other with approximately a predetermined inter-substrate spacing, by unshown spacers scattered and distributed between the substrates, or spacers or the like mixed into the seal material 203.

Subsequently, liquid crystal 204 is poured in from an unshown opening of the seal material 203, and the opening of the seal material 203 is closed by a sealing material such as an ultraviolet ray curing resin or the like. Thus, following the completion of the primary panel structures, the retardation films 205 and 207, and the polarizing plates 206 and 208 are attached to the outer face of the substrates 201 and 202 by adhesion or the like.

The present embodiment comprises a step for forming a colored layer having light color portions and deep color portions with higher light density than the light color portions on a substrate, and a step for forming a reflective layer having transmitting portions on the substrate, wherein, in the step for forming the colored layer, the deep color portions are formed on the transmitting portions, and the light color portions are formed on the reflective layer excluding the transmitting portions. Accordingly, the saturation can be changed according to the emission position of the light, due to the light color portions and deep color portions being provided in the colored layer. Also, deep color portions are formed at predetermined regions on the substrate and the and light color portions are formed at other than the predetermined regions, so that the deep color portions and the light color portions are formed in the planar regions which differ from each other, so the thickness of the color filter can be reduced, and the surface thereof can be leveled, and consequently the characteristics of the electro-optical device can be improved.

[Tenth Embodiment]

Figure 11:
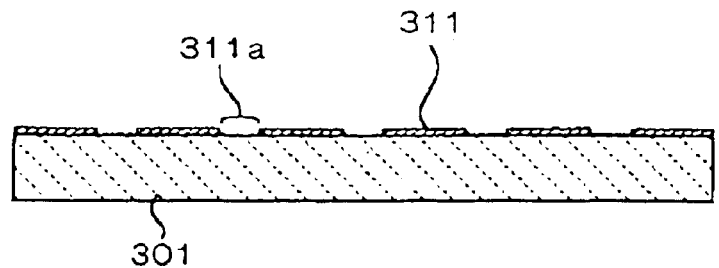
FIG. 11 is schematic process drawings (a) through (d) illustrating the manufacturing method of a color filter substrate according to a tenth embodiment of the present invention, in model fashion.
Figure 11:
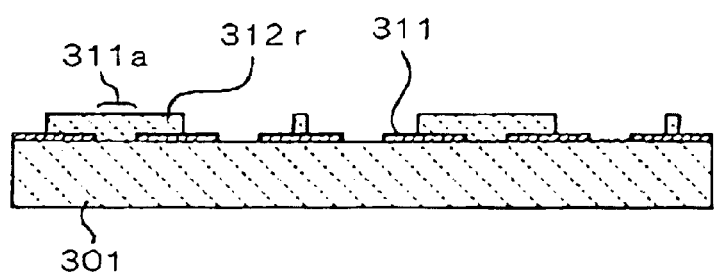
Figure 11:
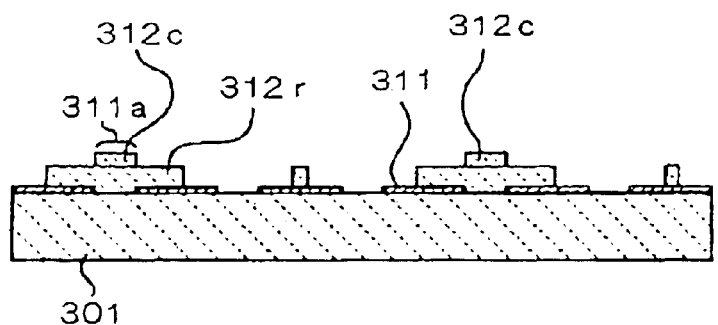
Figure 11:
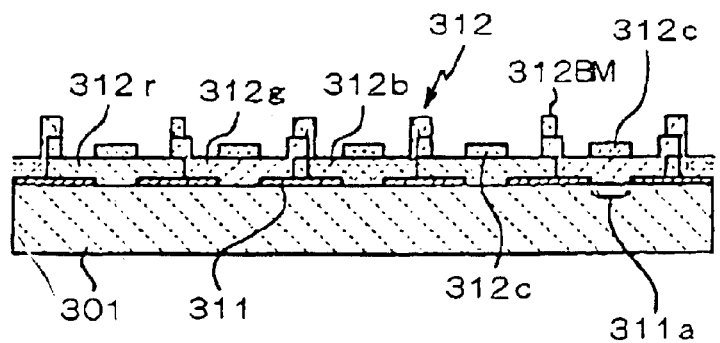

Next, the method for manufacturing a color filter substrate as a tenth embodiment according to the present invention will be described with reference to FIG. 11. This embodiment is a method for manufacturing a color filter substrate equivalent to the substrate 301 used in the liquid crystal display panel 300 according to the second embodiment shown in FIG. 2.

In this embodiment, first, as shown in FIG. 11(a), a reflective layer 311 having openings 311a is formed on the substrate 301.

Next, as shown in FIG. 11(b), light color portions of the colored layer 312r are formed on the reflective layer 311. The light color portions are formed so as to also cover over the openings 311a of the reflective layer 311.

Subsequently, as shown in FIG. 11(c), deep color portions 312c are formed on the light color portions, restricted to regions immediately above the openings 311a of the reflective layer 311, and the colored layer 312r with deep color portions 312c partially layered on the light color portions is completed. The same steps are then repeated for other hues as well, thus forming the colored layers 312r, 312g, and 312b, as shown in FIG. 11(d). At this time, the overlaying shielding portion 312BM is also formed in the same manner as above.

Though the colored layers are formed sequentially by hue in the present embodiment, an arrangement may be made wherein the light color portions are formed for multiple hues, following which the deep color portions are sequentially formed for multiple hues.

Figure 2:
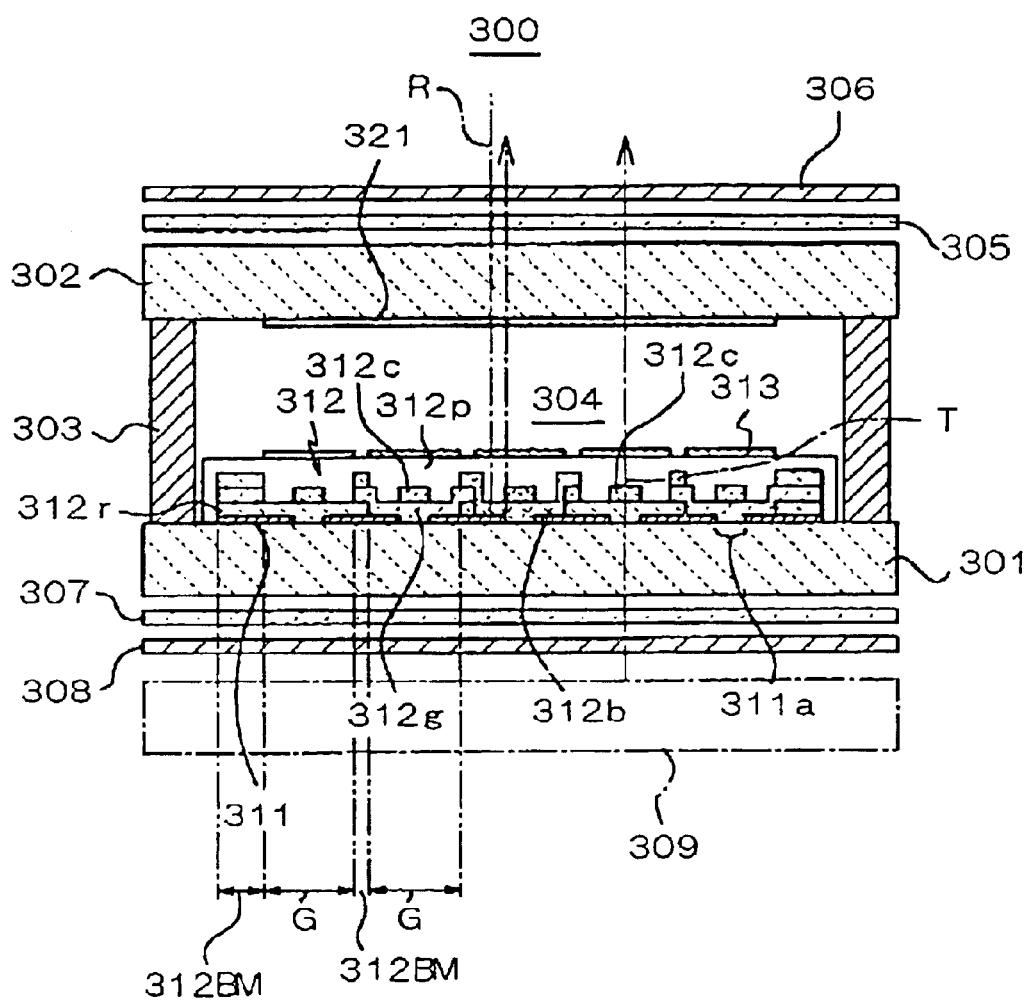
FIG. 2 is a schematic cross-sectional diagram illustrating the structure of a liquid crystal display panel according to a second embodiment of the present invention, in model fashion.

In the event of forming a liquid crystal display panel 300 shown in FIG. 2 using the color filter substrate according to the present embodiment, this is performed in the same way as in the ninth embodiment.

The present embodiment comprises a step for forming a colored layer having light color portions and deep color portions with higher light density than the light color portions on a substrate, wherein, in the step for forming the colored layer, the deep color portions are formed only at regions overlaying the transmitting portions of the reflective layer, and the light color portions are formed on the substrate including those regions. Accordingly, the deep color portions and the light color portions mutually overlap in the regions overlaying the transmissive portion, so there is no need to form the light color portions to match the deep color portions, allowing easy manufacturing. In this case, either the light color portions or the deep color portions may be formed on top, or the light color portions and the deep color portions may be alternately layered, or may be formed so as to mutually be overlaid in planar fashion but mutually separated.

[Eleventh Embodiment]

Figure 12:
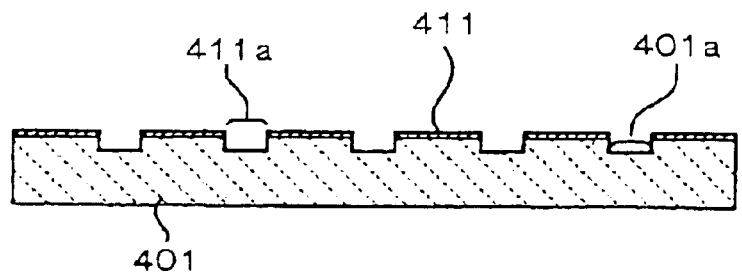
FIG. 12 is schematic process drawings (a) through (d) illustrating the manufacturing method of a color filter substrate according to an eleventh embodiment of the present invention, in model fashion.
Figure 12:
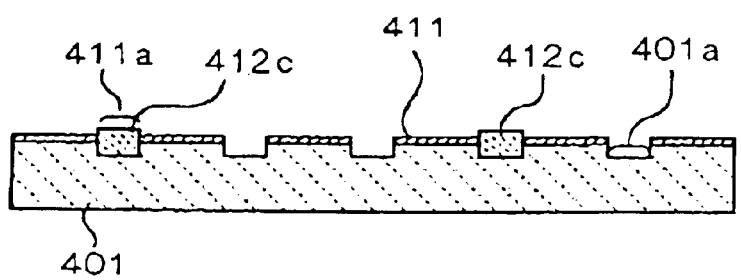
Figure 12:
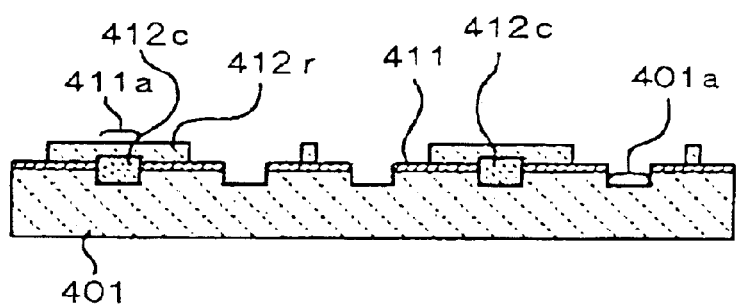
Figure 12:
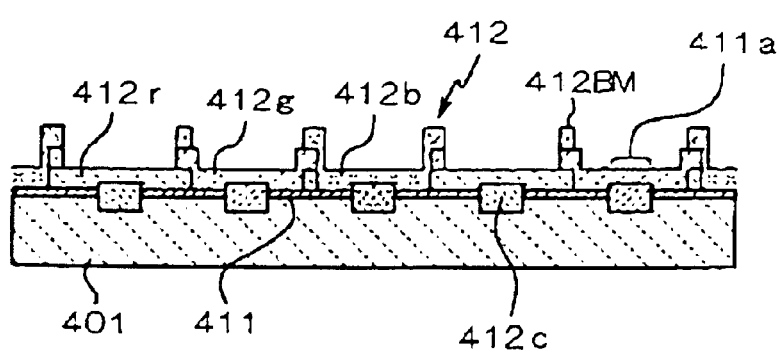

Next, the method for manufacturing a color filter substrate as an eleventh embodiment according to the present invention will be described with reference to FIG. 12. This embodiment is a method for manufacturing a color filter substrate equivalent to the substrate 401 used in the liquid crystal display panel 400 according to the third embodiment shown in FIG. 3.

In this embodiment, as shown in FIG. 12(a), recessed portions 401a are formed first on the substrate 401. These recessed portions 401a can be formed by forming a mask of unshown resist or the like, and selectively etching the substrate 401 by wet etching using a hydrofluoric acid etching fluid or the like.

Next, a reflective layer 411 is formed on the surface of the substrate 401, in the same way as in the ninth and tenth embodiments. Openings 411a are provided on the reflective layer 411 at the formation regions of the recessed portions 401a, by photo-lithography or the like.

Subsequently, as shown in FIG. 12(b), the deep color portions 312c of the colored layer 312r are formed within the recessed portion 401a. Then, as shown in FIG. 12(c), light color portions are further formed on the deep color portions 412c, thereby forming the colored layer 412r. Here, the light color portions are formed so as to not only cover the deep color portions 412c, but so as to cover pixels in entirety. Subsequently, film formation is performed for the other hues as well, thereby forming the colored layers 412g and 412b.

Although with the present embodiment, a colored layer is formed by forming deep color portions and then forming light color portions of the same hue, and the same procedures are repeated for each hue, an arrangement may be made wherein the deep color portions are formed for multiple hues, following which light color portions may be sequentially formed for multiple hues.

In the event of forming a liquid crystal display panel using the color filter substrate according to the present embodiment, this is performed the same way as in the ninth embodiment.

The present embodiment comprises a step for forming recessed portions on the surface of the substrate, and the transmissive portions of the reflective layer overlay the recessed portions, so the deep color portions can be formed thickly by forming the recessed portions on the surface of the substrate and then forming the deep color portions in the recessed portions.

[Twelfth Embodiment]

Figure 13:
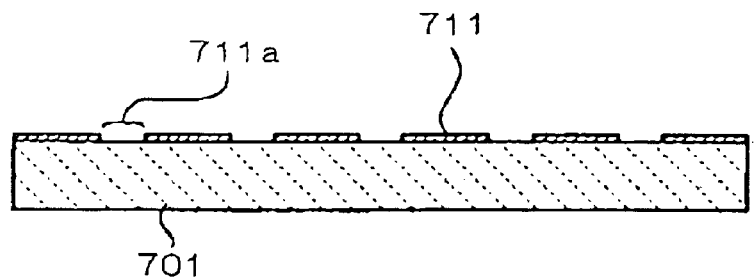
FIG. 13 is schematic process drawings (a) through (d) illustrating the manufacturing method of a color filter substrate according to a twelfth embodiment of the present invention, in model fashion.
Figure 13:
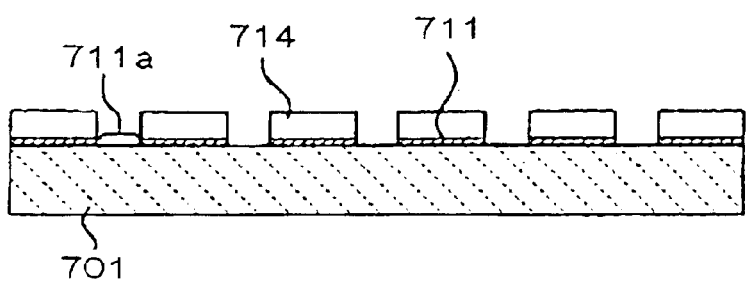
Figure 13:
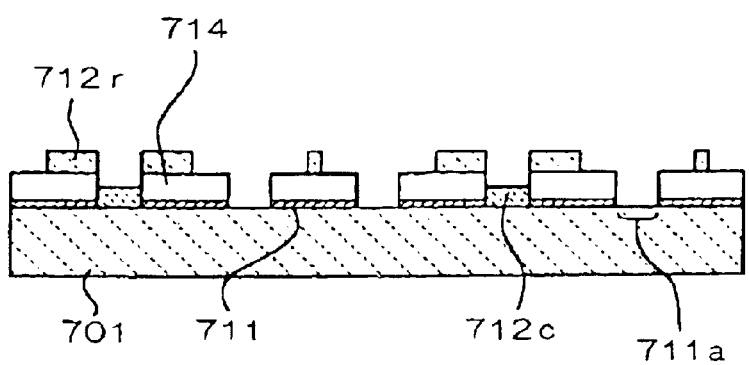
Figure 13:
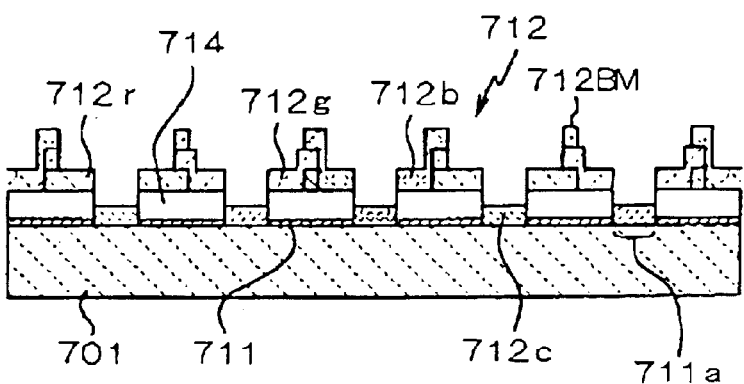

Next, the method for manufacturing a color filter substrate as a twelfth embodiment according to the present invention will be described with reference to FIG. 13. This embodiment is a method for manufacturing a color filter substrate equivalent to the substrate 701 used in the liquid crystal display panel 700 according to the sixth embodiment shown in FIG. 6.

In this embodiment, as shown in FIG. 13(a), a reflective layer 711 is formed first on the substrate 701. Openings 711a are formed for each pixel on the reflective layer 711. Next, a transmissive layer 714 is formed on the reflective layer 711, as shown in FIG. 13(b). Non-formation regions (openings) are provided on the openings 711a on the transmissive layer 714.

The transmissive layer 714 is formed at portions excluding regions directly above the openings 711a of the reflective layer 711. The transmissive layer 714 can be formed by, for example, forming an inorganic layer or organic layer on the entire surface of the substrate 701 and reflective layer 711, following which the portions immediately above the openings 711a are selectively removed by photo-lithography or the like. As for the materials of the transmissive layer 714, inorganic materials such as $SiO_2$, $TiO_2$, or organic resins such as transparent acrylic resin or epoxy resin or the like, can be used.

Next, as shown in FIG. 13(c), deep color portions 712c are formed on the substrate 701 at the regions of the openings 711a of the reflective layer 711, and light color portions are formed on the transmissive layer 714, thereby forming a colored layer 712r comprising deep color portions 712c and light color portions. Subsequently, the same steps are performed for the other hues as well, thereby forming the colored layers 712g and 712b, as shown in FIG. 13(d).

In the present embodiment, either the deep color portions 712c or the light color portions may be formed first. Also, although the deep color portions and the light color portions are formed sequentially for each color layer, an arrangement may be made wherein the deep color portions are formed sequentially for multiple hues, and then the light color portions are formed sequentially for multiple hues.

In the event of forming a liquid crystal display panel using the color filter substrate according to the present embodiment, this is performed the same way as in the ninth embodiment.

The present embodiment comprises a step for forming on a substrate a colored layer having light color portions and deep color portions with higher light density than the light color portions, a step for forming a reflective layer having transmitting portions on the substrate, and a step for forming a transmissive layer on the reflective layer substantially capable of transmitting light, wherein, in the step for forming the transmissive layer, the transmissive layer is formed on the reflective layer excluding the transmitting portions, and in the step for forming the colored layer, the deep color portions are formed on the transmitting portions, and the light color portions are formed on the transmissive layer. Accordingly, surface steps can be provided between the light color portion and deep color portion in the colored layer according to presence or absence of the transmissive layer formed on the reflective layer. Also, the deep color portions can be formed thicker than the light color portions, thereby further improving the saturation of the transmitted light.

[Thirteenth Embodiment]

Figure 14:
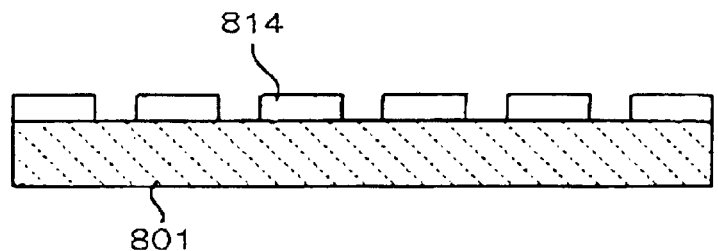
FIG. 14 is schematic process drawings (a) through (d) illustrating the manufacturing method of a color filter substrate according to a thirteenth embodiment of the present invention, in model fashion.
Figure 14:
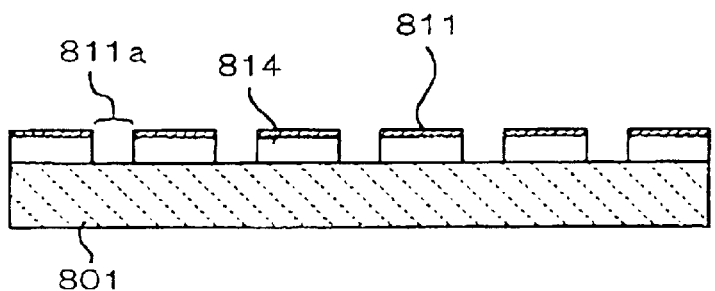
Figure 14:
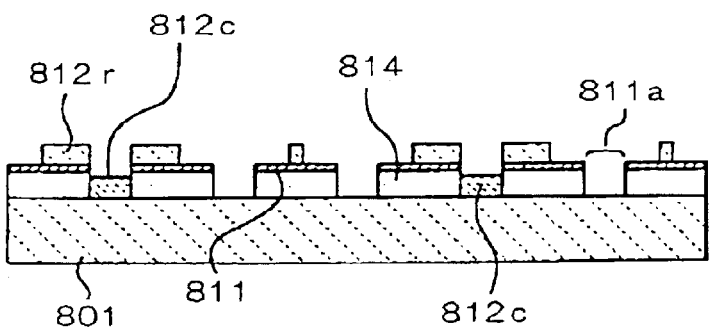
Figure 14:
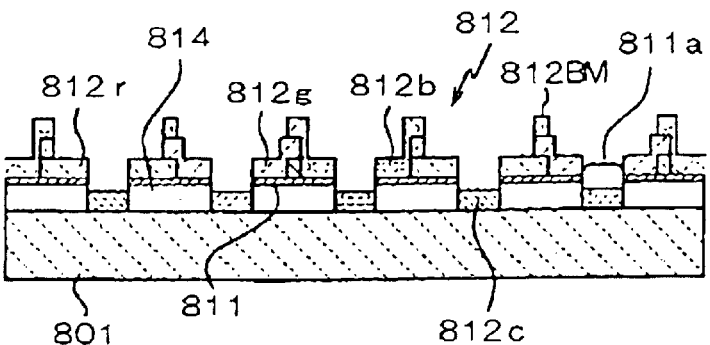

Next, the method for manufacturing a color filter substrate as a thirteenth embodiment according to the present invention will be described with reference to FIG. 14. This embodiment is a method for manufacturing a color filter substrate equivalent to the substrate 801 used in the liquid crystal display panel 800 according to the seventh embodiment shown in FIG. 7.

In this embodiment, as shown in FIG. 14(a), a foundation layer 814 is partially formed first on the substrate 701. This foundation layer 814 has predetermined non-formation regions (openings) for each pixel. Next, a reflective layer 811 is formed on the foundation layer 814. Openings 811a are formed in the reflective layer 811 at each pixel. The openings 811a are formed so as to match the non-formation regions of the foundation layer 814 in planar fashion.

Besides being formed with the same material and same method as the transmissive layer in the twelfth embodiment, the foundation layer 814 can also be formed using material other than transmissive material.

Next, as shown in FIG. 14(c), deep color portions 812c are formed on the substrate 801 at the regions of the openings 811a of the reflective layer 811, and also light color portions are formed on the reflective layer 811, thereby forming a colored layer 812r comprising deep color portion 812c and light color portions. Subsequently, the same steps are executed with regard to the other hues as well, thereby forming the colored layers 812g and 812b, as shown in FIG. 14(d).

With the present embodiment, either the deep color portions 812c or the light color portions may be formed first. Also, although the deep color portions and the light color portions are formed sequentially for each color layer, an arrangement may be made in the present embodiment wherein the deep color portions are formed sequentially for multiple hues, and the light color portions are formed sequentially for multiple hues.

In the event of forming a liquid crystal display panel using the color filter substrate according to the present embodiment, this is performed the same way as in the ninth embodiment.

The present embodiment comprises a step for forming on a substrate a colored layer having light color portions and deep color portions with higher light density than the light color portions, a step for partially forming a foundation layer on the substrate, and a step for forming a reflective layer having transmitting portions on the substrate, wherein, in the step for forming the reflective layer, the transmitting portions are formed at the non-formation regions of the foundation layer, and in the step for forming the colored layer, the deep color portions are formed at the non-formation regions of the foundation layer, and the light color portions are formed on the reflective layer excluding the transmitting portions of the reflective layer. Accordingly, surface steps can be provided between the light color portion and deep color portion in the colored layer according to presence or absence of the foundation layer. Also, the deep color portions can be formed thicker than the light color portions, thereby further improving the saturation of the transmitted light passing through the transmitting portions.

[Fourteenth Embodiment]

Figure 15:
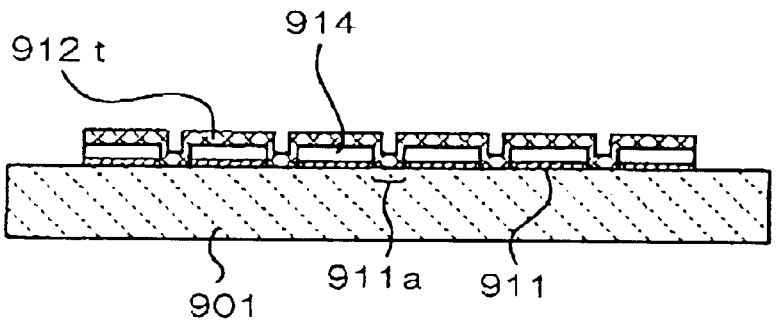
FIG. 15 is schematic process drawings (a) through (d) illustrating the manufacturing method of a color filter substrate according to a fourteenth embodiment of the present invention, in model fashion.
Figure 15:
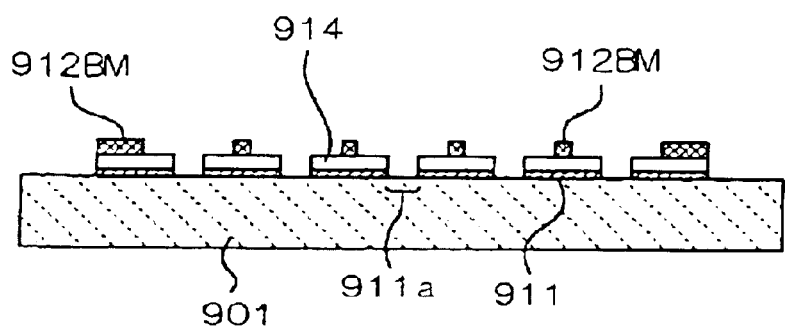
Figure 15:
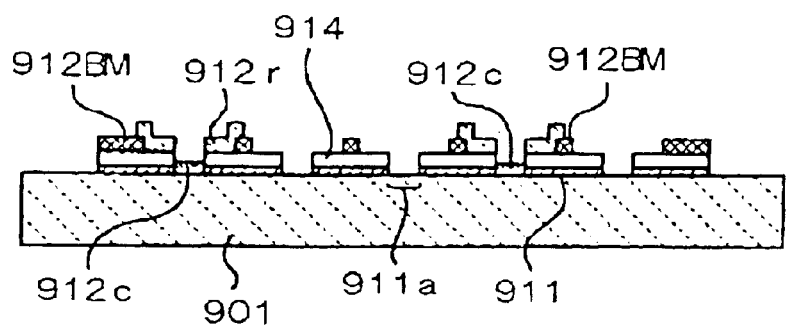
Figure 15:
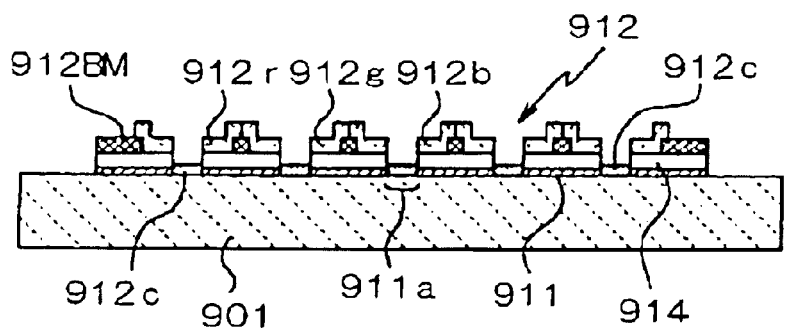

Next, the method for manufacturing a color filter substrate as a fourteenth embodiment according to the present invention will be described with reference to FIG. 15. This embodiment is a method for manufacturing a color filter substrate equivalent to the substrate 901 used in the liquid crystal display panel 900 according to the eighth embodiment shown in FIG. 8.

In this embodiment, as shown in FIG. 15(a), a reflective layer 911 having openings 911a is formed first on the surface of the substrate 901, and subsequently, a transmissive layer 914 is formed on the reflective layer 911. Openings 914a are provided to the transmissive layer 914 above the openings 911a of the reflective layer 911.

Next, as shown in FIG. 15(b), a black shielding layer 912BM is formed on the substrate 901 and the transmissive layer 914. More specifically, black photosensitive resin 912t is coated as shown in FIG. 15(a), which is patterned by exposing with a predetermined pattern and developing.

Next, as shown in FIG. 15(c), the colored layer 912r is formed by photo-lithography. More specifically, deep color portions 912c are formed on the substrate 901 within the openings 911a of the reflective layer 911, and also, light color portions with smaller color density than the deep color portions 912c are formed at pixel regions other than the openings 911a, thereby forming the colored layer 912r by the deep color portions 912c and the light color portions.

Further, the colored layers 912g and 912b exhibiting other hues are formed in the same way, as shown in FIG. 15(d). Also, in the present embodiment, either the deep color portions 912c or the light color portions may be formed first. Also, although the deep color portions and the light color portions are formed sequentially for each color layer, an arrangement may be made wherein the deep color portions are formed sequentially for multiple hues, and the light color portions are formed sequentially for multiple hues.

In this embodiment, the transmissive layer 914 is formed on the reflective layer 911, and the black shielding layer 912BM is formed on the transmissive layer 914. Now, conventionally, in the event of directly forming the black shielding layer 912BM on the reflective layer formed of metal, there is a known problem wherein residue of the black resin still remains in regions from which the black resin has been removed during patterning of the black resin, causing deterioration in brightness of the color filter. However, with the present embodiment, the black shielding layer 912BM is formed on the transmissive layer 914 covering the reflective layer 911, so residue of the black resin does not readily occur, and an excellent and bright color filter 912 can be formed.

Also, in the event of forming a liquid crystal display panel using the color filter substrate according to the present embodiment, this is performed the same way as in the ninth embodiment.

In the present embodiment, a black shielding layer is formed instead of the overlaying shielding layer of the above-described embodiments, and is formed so as to reduce the thickness of the color filter, and improve the flatness of the surface of the color filter. This black shielding layer can be used instead of the overlaying shielding layer of the first embodiment through the thirteenth embodiment.

The present embodiment comprises a step for forming on a substrate a colored layer having light color portions and deep color portions with higher light density than the light color portions, a step for forming a reflective layer having transmitting portions on the substrate, and a step for forming on the reflective layer a transmissive layer substantially capable of transmitting light, wherein, in the step for forming the transmissive layer, the transmissive layer is formed on the reflective layer excluding the transmitting portions, and in the step for forming the colored layer, the deep color portions are formed on the transmitting portions, and the light color portions are formed on the transmissive layer. Accordingly, surface steps can be provided between the light color portion and deep color portion in the colored layer according to presence or absence of the transmissive layer formed on the reflective layer. Also, the deep color portions can be formed thicker than the light color portions, thereby further improving the saturation of the transmitted light passing through the transmitting portions.

[Other Embodiments]

Next, other example structures which can be used in the above-described embodiments will be described with reference to FIG. 17.

Figure 17:
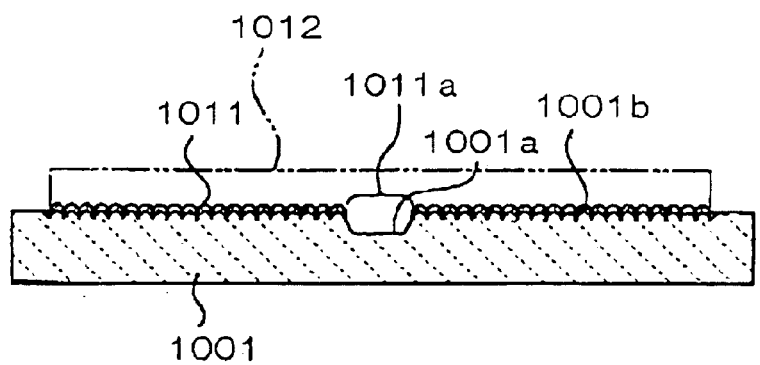
FIG. 17 is schematic partial cross-sectional diagrams (a) through (d) illustrating other configuration examples applicable to the above embodiments, in model fashion.
Figure 17:
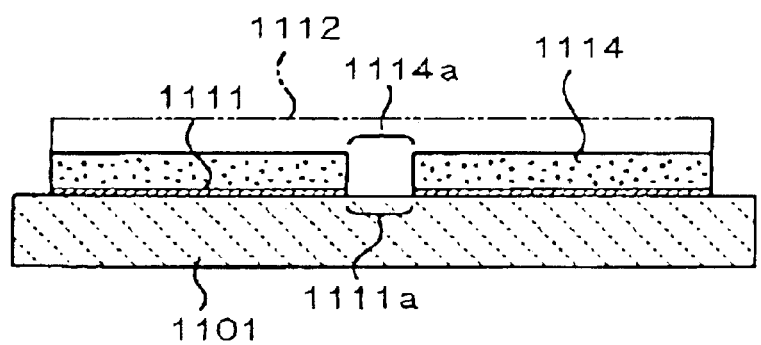
Figure 17:
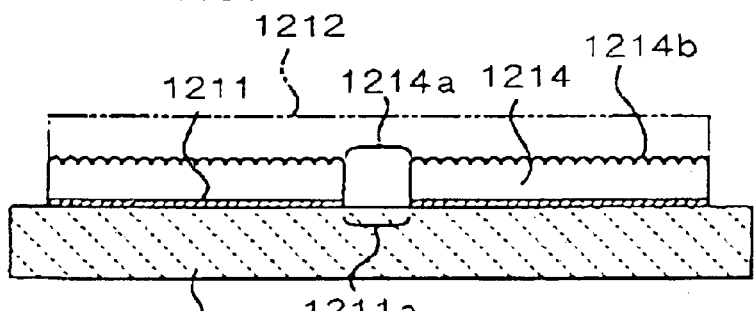
Figure 17:
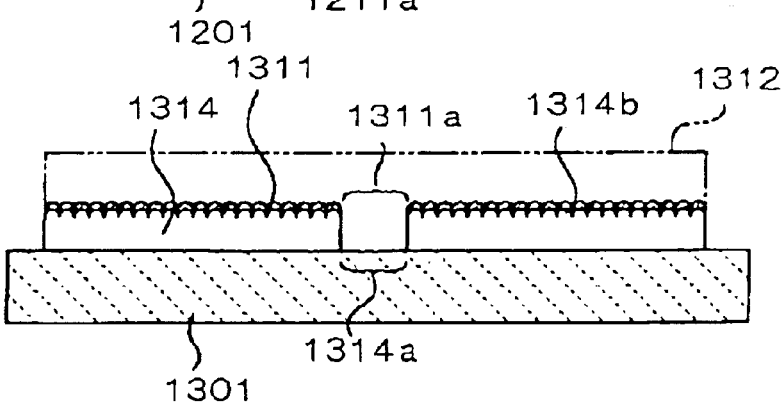

In the example structure illustrated in FIG. 17(*a*), recessed portions 1001*a* are formed on the surface of the substrate 1001, while finely patterned indentations 1001*b* are formed on the surface other than the recessed portions 1001*a*, and a reflective layer 1011 is formed on the finely patterned indentations 1001*b*. Openings 1011*a* are provided in the reflective layer 1011 at the region of the recessed portions 1001*a*. The color filter 1012 having the colored layers shown in the above embodiments is formed on these structures.

In the present embodiment, overall finely patterned indentations are formed on the reflective layer 1011 due to being formed on the patterned indentations 1001*b*. Accordingly, the reflected light reflected by the reflective layer 1011 is scattered to a suitable degree, so in the event that a liquid crystal display panel is formed, blinding from illumination light or sunlight in reflective display, picking up surrounding scenery, etc., can be prevented.

Now, the patterned indentations 1001*b* can be formed to provide a surface coarseness suitable for scattering light by selecting in advance the formula for an etching fluid such as hydrofluoric acid or the like, and etching, using this etching fluid. Also, these may be formed by forming a mask using photo-lithography, and executing etching through this mask.

This example structure can be applied to, of the above embodiments, those wherein recessed portions are formed on the surface of the substrate, and the reflective layer is formed directly on the substrate surface. Also, the structure of the patterned indentations 1001*b* and the reflective layer 1011 alone can be applied to embodiments wherein the recessed portions are not provided, as well.

In the example structure shown in FIG. 17(*b*), a reflective layer 1111 having openings 1111*a* is formed on a substrate 1101, and a transmissive layer 1114 is formed on the reflective layer 1111*a*. The openings 1114*a* of the transmissive layer 1114 are formed upon the openings 1111*a* of the reflective layer 1111 so that they correspond to each other. The color filter 1112 is then formed upon the transmissive layer 1114.

With this example structure, fine particles (e.g., silica particles or the like) with a different light refraction from the material of the transmissive layer 1114 are dispersed and disposed within the transmissive layer 1114. Accordingly, both the light heading toward the reflective layer 1111 and the light reflected from the reflective layer 1111 is scattered in the transmissive layer 1114, so blinding or picking up surrounding scenery in reflective display can be reduced, as in the above example structure. Incidentally, this example structure can be applied to all of the above embodiments having a transmissive layer on a reflective layer.

In the example structure shown in FIG. 17(*c*), a reflective layer 1211 having openings 1211*a* is formed on a substrate 1201, and a transmissive layer 1214 is formed on the reflective layer 1211. The openings 1214*a* of the transmissive layer 1214 are formed upon the openings 1211*a* of the reflective layer 1211 so that they correspond to each other. The color filter 1212 is then formed upon the transmissive layer 1214.

In this example structure, fine patterned indentations 1214*b* are formed on the surface of the transmissive layer 1214, so both the light heading toward the reflective layer 1211 and the light reflected from the reflective layer 1211 is scattered by the patterned indentations 1014*b*. Accordingly, blinding and picking up surrounding scenery in reflective display can be reduced in this example structure as well. As methods for forming the patterned indentations 1214*b*, in addition to the etching method described in the description portion of the example structure shown in FIG. 17(*a*), there are methods for patterning the material disposed on the substrate with a predetermined cycle so as to form a cyclic structure, and softened by heating, so as to provide with a suitable degree of fluidity, and thereby forming patterned indentations, and so forth. Incidentally, this example structure can be applied to all of the above embodiments having a transmissive layer on a reflective layer.

In the example structure shown in FIG. 17(*d*), a foundation layer 1314 having openings 1314*a* is formed on a substrate 1301, fine patterned indentations 1314*b* are formed on the surface of the foundation layer 1314, and a reflective layer 1311 is formed thereupon. The reflective layer 1311 has openings 1311*a* formed immediately above the foundation layer 1314*a*. Now, the patterned indentations 1314*b* of the foundation layer 1314 can be formed with the same method as the patterned indentations forming method with regard to the transmissive layer shown in FIG. 17(*c*). The color filter 1312 is formed upon the reflective layer 1311.

In this example structure, due to the reflective layer 1311 being formed on the patterned indentations 1314*b* of the foundation layer 1314, finely patterned indentations are formed on the reflective face thereof, so blinding or picking up surrounding scenery, etc., can be prevented, as in the above cases. Incidentally, this example structure can be applied to all of the above embodiments having a reflective layer formed on a foundation layer.

[Embodiment 1]

Figure 19:
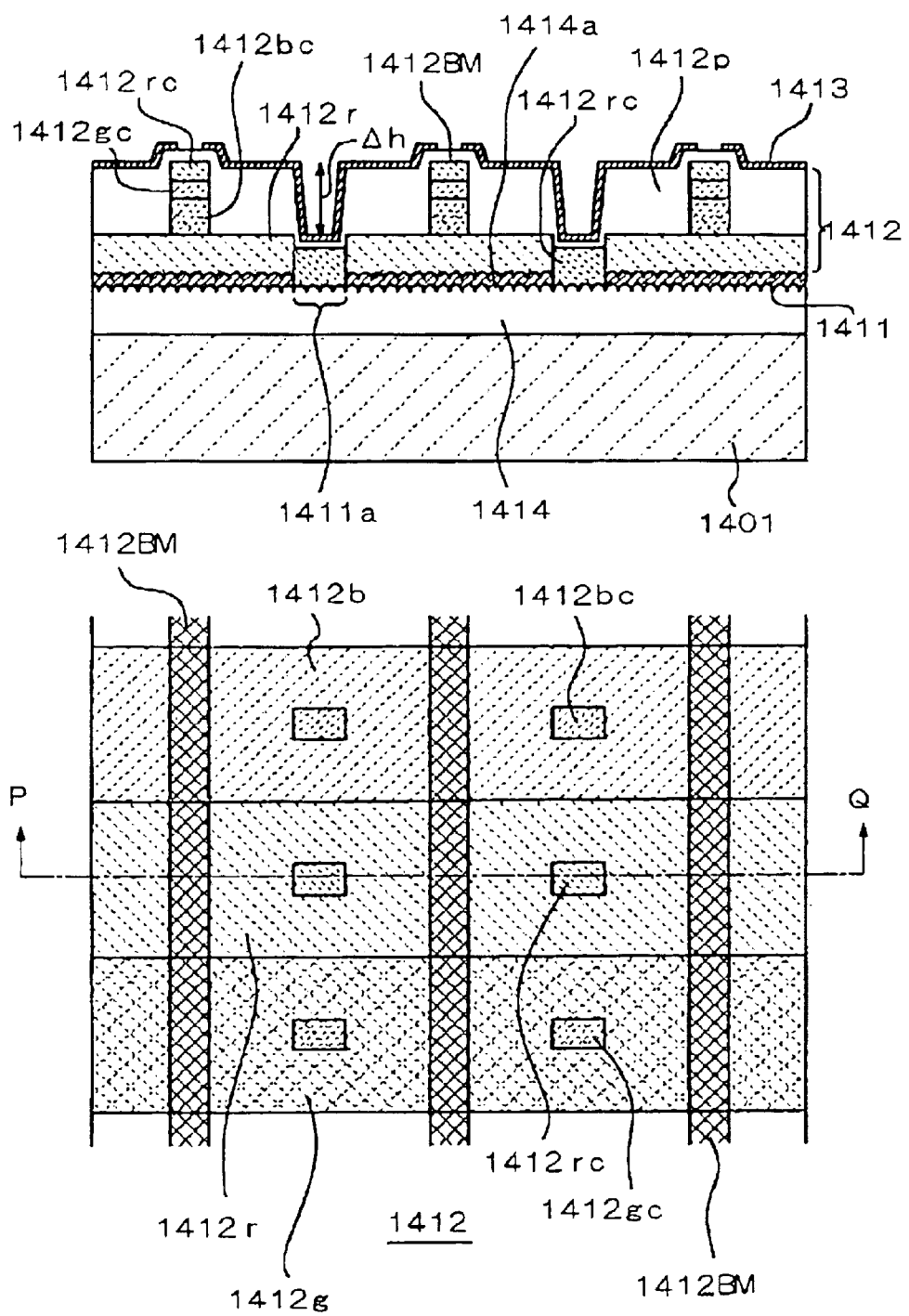
FIG. 19 is an enlarged partial cross-sectional diagram of a color filter substrate according to an Embodiment 1, and a plan view of the color filter, for illustrating a more specific structure.

Next, with reference to FIG. 19, a more detailed Embodiment 1, capable of being applied to the above embodiments, will be described. FIG. 19 is an enlarged partial cross-sectional diagram typically illustrating a part of the cross-sectional structure of a color filter substrate, and a schematic plan view of the color filter at the region corresponding thereto. Here, the enlarged partial cross-sectional diagram indicates a cross-section along the P–Q line in the schematic plan view.

In this Embodiment 1, a transmissive layer 1414 is formed on the substrate 1401. This transmissive layer 1414 is formed of a material capable of transmitting light, e.g., a transparent material. Particularly, it is preferable that an organic insulating material is used. Uneven patterns of raised and lowered regular or irregular repeated patterns are formed on the surface 1414*a* of the transmissive layer 1414. The uneven patterns can be formed using the method described in FIGS. 17(*c*) and (*d*). The thickness of the transmissive layer 1414 is approximately 2 $\mu$m, for example.

A reflective layer 1411 of Al, Al alloy, silver, APC alloy or like silver alloy, or the like, is formed on the transmissive layer 1414. This reflective layer 1411 can be formed by sputtering or vapor deposition or the like. Since the reflective layer 1411 is formed on the surface of the transmissive layer 1414, it is possible to make the reflecting surface of the reflective layer 1411 uneven. The thickness of the reflective layer 1411 is approximately 0.2 µm, for example. Openings 1411a are provided in the reflective layer 1411 at each pixel region.

A color filter 1412 of a known photosensitive resin material or the like is formed on the transmissive layer 1414 and the reflective layer 1411. The color filter 1412 contains colored layers, comprising deep color portions 1412rc (red deep color portion), 1412gc (green deep color portion), and 1412bc (blue deep color portion) formed on the openings 1411a, and light color portions 1412r (red light color portion), 1412g (green light color portion), and 1412b (blue light color portion) formed on the reflective layer 1411.

Also, the deep color portions 1412rc, 1412gc, and 1412bc are layered on the light color portions 1412r, 1412g, and 1412b, between the respective pixels, thereby forming overlaying shielding portions 1412BM. The overlaying shielding portions 1412BM are formed such that the light color portion 1412b is approximately 1.0 µm, the light color portion 1412g is approximately 0.5 µm, and the light color portion 1412r is approximately 0.5 µm, in order from the bottom.

A protective layer 1412p of a transparent material such as acrylic resin or other organic resin or the like is formed on the colored layer that has been formed as described above. While the protective layer 1412p is formed on the light color portions 1412r, 1412g, and 1412b, this is not formed on the deep color portions 1412rc, 1412gc, and 1412bc. The protective layer 1412p can be formed by forming an inorganic layer or organic layer on the entire face, and then selectively removing portions on regions directly above the openings 1411a by photo-lithography or the like. As for the material for the protective layer 1412p, besides organic resin such as transparent acrylic resin or epoxy resin, transparent inorganic materials such as $SiO_2$, $TiO_2$, etc., may be used. The thickness of the protective layer 1412p is approximately 2.2 µm, for example.

Transparent electrodes 1413 formed of transparent electroconductive material are formed on the protective layer 1412p. The transparent electrodes 1413 themselves reflect the presence or absence of the protective layer 1412p by being formed upon the protective layer 1412p, and there is a primary height difference Ah between the portions where the protective layer 1412p exists and the portions where it does not exist. This height difference Ah is approximately 0.2 µm, for example. Also, gap portions between adjacent transparent electrodes 1413 are disposed on the overlaying shielding portions 1412BM. The gap between adjacent transparent electrodes 1413 is approximately 8 to 10 µm.

In the present embodiment, the overlaying shielding portions 1412BM are formed by layering the deep color portions 1412rc, 1412gc, and 1412bc, so the transmissivity of the layered structure can be reduced as compared to layering light color portions, so inter-pixel regions can be completely shielded from light. Also, an overlaying shielding portion 1412BM is layered directly on one of the light color portions 1412r, 1412g, and 1412b, formed in the pixel region, so the transmissivity of the region where the overlaying shielding portion 1412BM is disposed can be further reduced, and the height difference Ah can be readily provided. Incidentally, the overlaying shielding portion 1412BM has a tri-layer laminated structure on a light color portion, but it may have a structure of two layers or only one layer.

In Embodiment 1, in the event of having the thickness dimensions shown in the above examples, the entire thickness of the color filter substrate is 5.2 to 5.3 µm, and with the thickness of the liquid crystal layer in the reflective region at 3.25 µm, a TN liquid crystal panel or STN liquid crystal panel can be formed. In this arrangement, the thickness of the liquid crystal layer at the transmitting region is 5.25 µm. In this case, this is not a homogeneous liquid crystal layer as indicated in FIG. 16, nor is the thickness of the liquid crystal layer in the transmissive region twice the thickness of the liquid crystal layer in the reflective region, but the thickness of the liquid crystal layer in the transmissive region is 60% more than the thickness of the liquid crystal layer in the reflective region, so the transmissivity in both reflective display and transmissive display can be improved by optimizing the retardation value of the liquid crystal layer, and a bright display can be obtained.

[Embodiment 2]

Next, with reference to FIG. 20, Embodiment 2, which can be applied to the above embodiments, will be described. FIG. 20 is an enlarged partial cross-sectional diagram typically illustrating a part of the cross-sectional structure of a color filter substrate, and a schematic plan view of the color filter at the region corresponding thereto. Here, the enlarged partial cross-sectional diagram indicates a cross-section following the P–Q line in the schematic plan view.

In this Embodiment 2, uneven patterns of raised and lowered regular or irregular repeated patterns are formed on the surface 1501a of the substrate 1501 by etching or the like. A reflective layer 1511 of Al, Al alloy, silver, APC alloy or like silver alloy, or the like, is formed on the surface 1501a of the substrate 1501. This reflective layer 1511 can be formed by sputtering or vapor deposition or the like.

The reflecting surface of the reflective layer 1511 is formed with patterned indentations due to being formed on the surface 1501a. The thickness of the reflective layer 1511 is approximately 0.2 µm, for example.

Openings 1511a are provided to the reflective layer 1511 at each pixel region.

A color filter 1512 of a known photosensitive resin material or the like is formed on the reflective layer 1511. The color filter 1512 contains colored layers comprising deep color portions formed on the openings 1511a, namely 1512rc (red deep color portion), 1512gc (green deep color portion), and 1512bc (blue deep color portion), and light color portions formed on the reflective layer 1511, namely 1512r (red light color portion), 1512g (green light color portion), and 1512b (blue light color portion).

A protective layer 1512p of a transparent material such as acrylic resin or other organic resin or the like is formed on the color filter 1512 thus formed. While the protective layer 1512p is formed on the light color portions 1512r, 1512g, and 1512b, this is not formed on the deep color portions 1512rc, 1512gc, and 1512bc. The protective layer 1512p can be formed by forming an inorganic layer or organic layer on the entire face, and then selectively removing portions on regions directly above the openings 1511a by photo-lithography or the like. As for the material for the protective layer 1512p, besides organic resin such as transparent acrylic resin or epoxy resin, transparent inorganic materials such as $SiO_2$, $TiO_2$, etc., may be used. The thickness of the protective layer 1512p is approximately 2.2 µm, for example.

Transparent electrodes 1513 of transparent electroconductive material are formed on the protective layer 1512p.

The transparent electrodes 1513 themselves reflect the presence or absence of the protective layer 1512p by being formed upon the protective layer 1512p, and there is a primary height difference Δh between the portions where the protective layer 1512p exists and the portions where it does not exist. This height difference Δh is approximately 0.2 μm, for example.

In Embodiment 2, no overlaying shielding portions are formed, unlike Embodiment 1. Instead, the gap G between adjacent transparent electrodes 1513 is narrowed to around 4 to 6 μm. In this Embodiment, in the gap G between adjacent transparent electrodes 1513, a cross-field is generated due to the potential difference between the adjacent transparent electrodes 1513 in the driving state of the display, so shielding operations are obtained at the gap G by taking advantage of the orientation of the liquid crystal molecules near the gap G following this cross-field.

In Embodiment 2 as well, in the event of forming with the thickness dimensions shown in the above examples, a TN liquid crystal panel or STN liquid crystal panel can be formed so that the liquid crystal layer in the reflective region is 3.25 μm thick. Thus, the thickness of the liquid crystal layer in the transmissive region will be 5.25 μm. In this case, this is not a homogeneous liquid crystal layer as indicated in FIG. 16, nor is the thickness of the liquid crystal layer in the transmissive region twice the thickness of the liquid crystal layer in the transmissive region, but the thickness of the liquid crystal layer in the transmissive region is 60% more than the thickness of the liquid crystal layer in the reflective region, so the transmissivity in both reflective display and transmissive display can be improved by optimizing the retardation value of the liquid crystal layer, and a bright display can be obtained.

[Embodiment 3]

Figure 21:
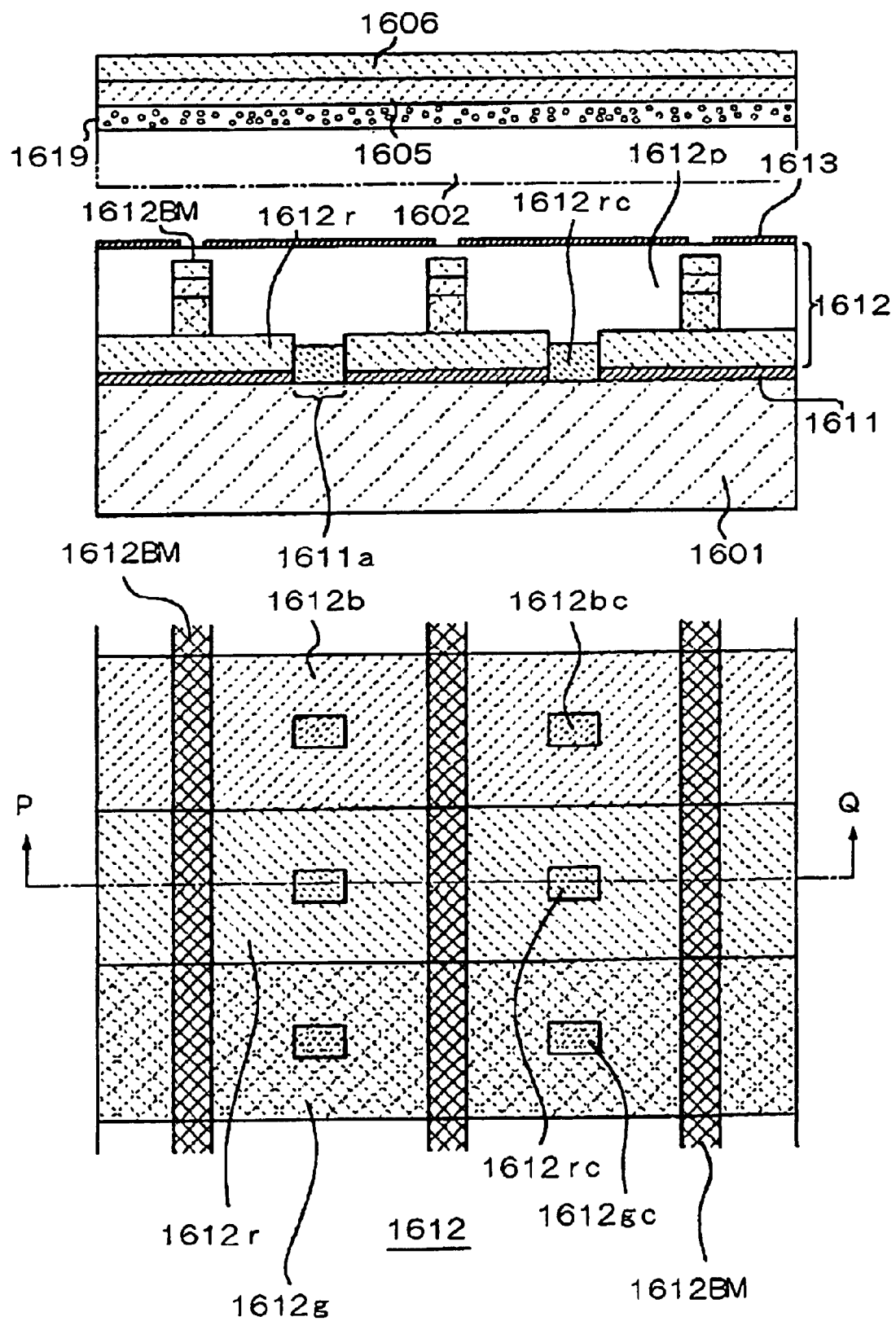
FIG. 21 is an enlarged partial cross-sectional diagram of a color filter substrate according to an Embodiment 3, and a plan view of the color filter, for illustrating a more specific structure.

Next, with reference to FIG. 21, a more detailed Embodiment 3, which can be applied to the above embodiments, will be described. FIG. 21 is an enlarged partial cross-sectional diagram typically illustrating a part of the cross-sectional structure of a color filter substrate, and a schematic plan view of the color filter at the region corresponding thereto. Here, the enlarged partial cross-sectional diagram indicates a cross-section following the P–Q line in the schematic plan view.

In this Embodiment 3, a reflective layer 1611 of Al, Al alloy, silver, APC alloy or like silver alloy, or the like is formed on the substrate 1601. This reflective layer 1611 can be formed by sputtering or vapor deposition or the like. The reflective layer 1611 is formed flat on the flat surface of the substrate 1601. The thickness of the reflective layer 1611 is approximately 0.2 μm, for example. Openings 1611a are provided to the reflective layer 1611 at each pixel region.

A color filter 1612 of a known photosensitive resin material or the like is formed on the reflective layer 1611. The color filter 1612 contains colored layers comprising deep color portions formed on the openings 1611a, namely 1612rc (red deep color portion), 1612gc (green deep color portion), and 1612bc (blue deep color portion), and light color portions formed on the reflective layer 1611, namely 1612r (red light color portion), 1612g (green light color portion), and 1612b (blue light color portion).

Also, the deep color portions 1612rc, 1612gc, and 1612bc are layered on the light color portions 1612r, 1612g, and 1612b, between each of the pixel regions, thereby forming overlaying shielding portions 1612BM. The overlaying shielding portions 1612BM are formed such that the light color portion 1612b is approximately 1.0 μm, the light color portion 1612g is approximately 0.5 μm, and the light color portion 1612r is approximately 0.5 μm, in order from the bottom layer.

A protective layer 1612p of a transparent material such as acrylic resin or other organic resin or the like is formed on the color filter 1612 that has been formed as described above. The protective layer 1612p has the surface that is practically flat, including the portions formed on the overlaying shielding portions 1612BM. As for the material for the protective layer 1612p, besides organic resin such as transparent acrylic resin or epoxy resin, transparent inorganic materials such as $SiO_2$, $TiO_2$, etc., may be used. The thickness of the protective layer 1612p is approximately 2.2 μm, for example.

Transparent electrodes 1613 of transparent electroconductive material are formed on the protective layer 1612p.

In the present embodiment, the overlaying shielding portions 1612BM are formed by layering the deep color portions 1612rc, 1612gc, and 1612bc on each other, so the shielding between pixel regions can be achieved more fully. Also, overlaying shielding portions 1612BM are layered directly on one of the light color portions 1612r, 1612g, and 1612b, formed in the pixel region, so the transmissivity of the overlaying shielding portion 1612BM can be further reduced. Incidentally, the overlaying shielding portion 1612BM has a tri-layer laminated structure on a light color portion, but it may have a structure of two layers or only one layer.

In Embodiment 3, a scattering layer 1619 is disposed on the observation side of the color filter 1612. Picking up surrounding scenery from a certain angle, blinding, insufficient brightness, etc., due to regular reflection of external light at the reflective layer 1611, is reduced by the scattering layer 1619. It is preferable for the scattering layer 1619 to have forward scattering properties. For example, the scattering layer may have fine particles dispersed therein, with the fine particles being made of a transparent material that has a refractive index slightly different from that of the base material.

Also, an adhesive layer having adhesive functions can be used as the scattering layer 1619. Such cases may include the one having a transparent adhesive agent used as a base material, and transparent fine particles with a refractive index that is slightly different from that of the base material dispersed therein. In this case, as shown in the figure, the scattering layer can be used as an adhesive layer for fixing by adhesion the substrate 1602 at the observation side (the two-dot dashed line in the figure) with the retardation film 1605 or the polarizing plate 1606 disposed at the observation side therefrom. Note that the surface structures of the substrate 1602 and liquid crystal layer are not shown.

[Example Structure of Color Filter]

Figure 22:
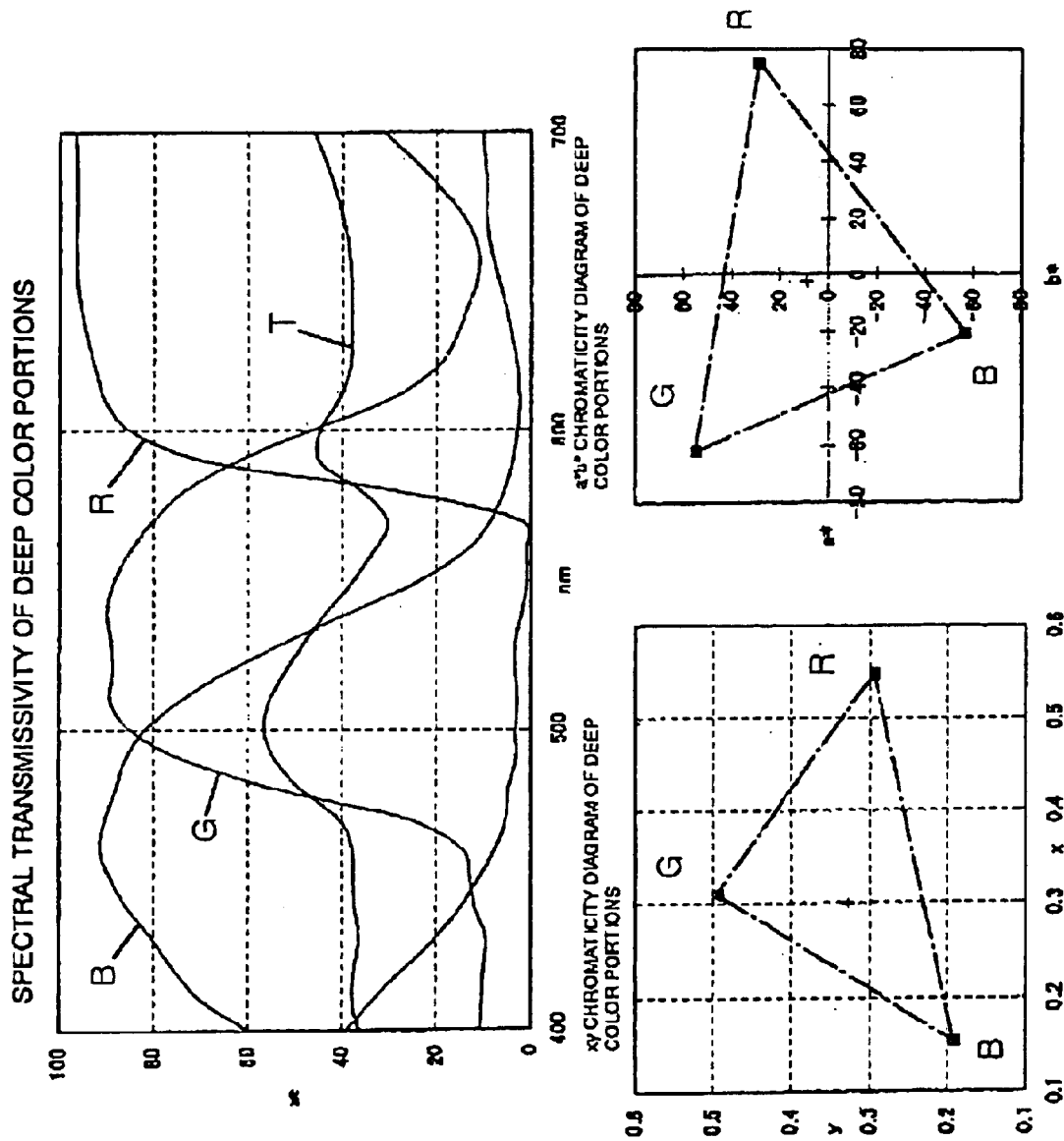
FIG. 22 is a diagram illustrating spectral transmissivity at the deep color portion of the color filters formed in Embodiments 1 through 3, and an xy chromaticity diagram and an a*b* chromaticity diagram.
Figure 23:
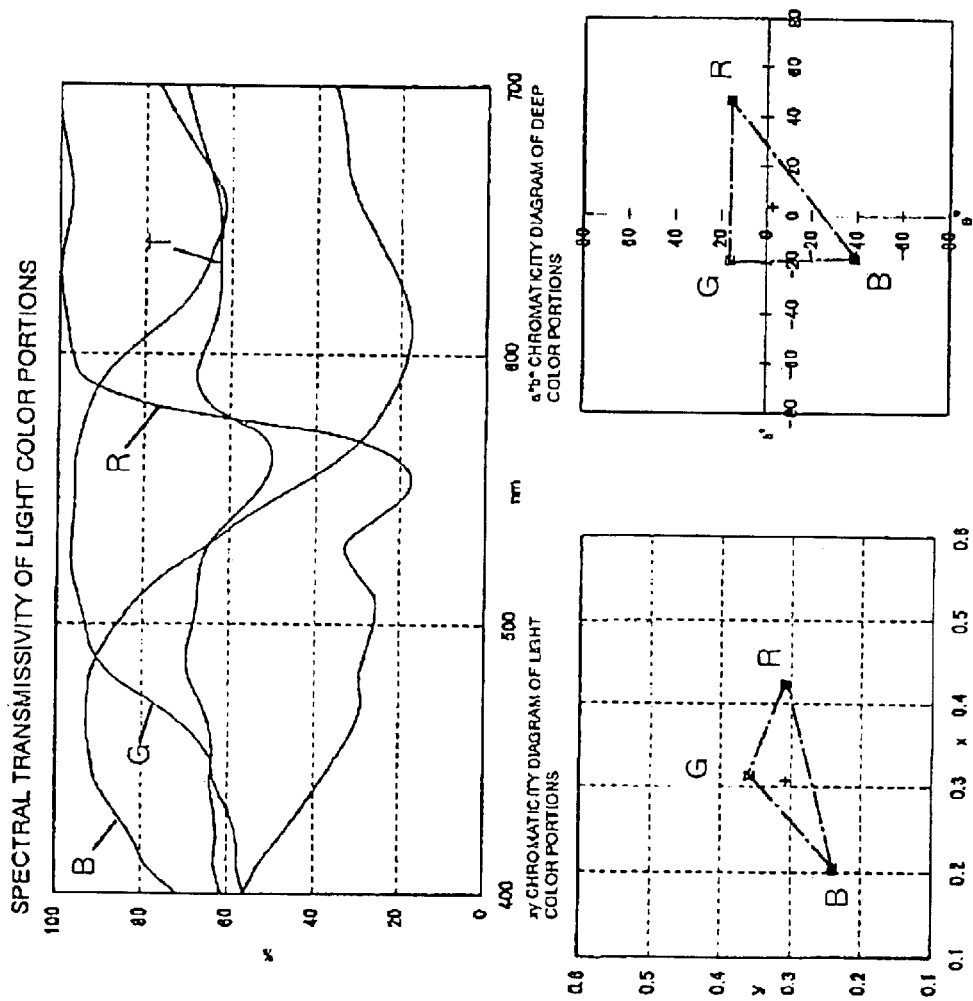
FIG. 23 is a diagram illustrating spectral transmissivity at the light color portion of the color filters formed in Embodiments 1 through 3, and an xy chromaticity diagram and an a*b* chromaticity diagram.

Finally, an example structure of the color filters 1412, 1512, and 1612 in the Embodiments 1 through 3 according to the present invention will be described with reference to FIG. 22 and FIG. 23. Note that this example structure can also be applied to the color filters of the above embodiments other than the Embodiments 1 through 3, in the same manner. FIG. 22 is a spectral properties diagram (a) illustrating the spectral properties of transmitted light at the deep color portions of the color filter, a CIE (1931) color system xy chromaticity diagram (b), and a CIE (1976) color system a*b* chromaticity diagram (c), while FIG. 23 is a spectral properties diagram (a) illustrating the spectral properties of transmitted light at the light color portions of the color filter, a CIE (1931) color system xy chromaticity diagram (b), and a CIE (1976) color system a*b* chromaticity diagram (c). Now, the diagrams illustrate the spectral transmissivity of transmitted light transmitted through the light color portions or deep color portions one time using the same C light source, and the color coordinates obtained.

As shown in FIG. 22, the primary wavelength range of light that can pass through the red deep color portions (R) is 600 to 700 nm, the average light transmissivity in this range is approximately 90%, and particularly the transmissivity is at its greatest (approximately 95%) in the range of 640 to 700 nm. The primary wavelength range of light that can pass through the green deep color portions (G) is 495 to 570 nm, the average light ransmissivity in this range is approximately 85%, and particularly the transmissivity is at its greatest (approximately 90%) in the range of 510 to 550 nm. The primary wavelength range of light that can pass through the blue deep color portions (B) is 435 to 500 nm, the average light transmissivity in this range is approximately 85%, and particularly the transmissivity is at its greatest (approximately 88%) in the range of 445 to 480 nm.

Also, the Y value with the CIE color system (1931) is 24 to 26 at the red deep color portions (R), 70 to 72 at the green deep color portions (G), and around 29 to 31 at the blue deep color portions (B). The L* value with the CIE color system (1976) is 56 to 58 at the red deep color portions (R), 86 to 88 at the green deep color portions (G), and around 60 to 62 at the blue deep color portions (B).

Further, the area of a triangle having as the apexes thereof three points corresponding to the hue of the red deep color portions (R), green deep color portions (G), and the blue deep color portions (B) is approximately 0.05 (on the xy chromaticity diagram) and approximately 7000 (on the a*b* chromaticity diagram).

Also, as shown in FIG. 23, the primary wavelength range of light that can pass through the red light color portions (R) is 585 to 700 nm, the average light transmissivity in this range is approximately 93%, and particularly the transmissivity is at its greatest (approximately 96%) in the range of 590 to 700 nm. The primary wavelength range of light that can pass through the green light color portions (G) is 480 to 600 nm, the average light transmissivity in this range is approximately 92%, and particularly the transmissivity is at its greatest (approximately 94%) in the range of 500 to 580 nm. The primary wavelength range of light that can pass thorugh the blue light color portions (B) is 430 to 510 nm, the average light transmissivity in this range is approximately 89%, and particularly the transmissivity is at its greatest (approximately 92%) in the range of 440 to 500 nm.

Also, the Y value with the CIE color system (1931) is 46 to 48 at the red light color portions (R), 89 to 91 at the green light color portions (G), and around 44 to 46 at the blue light color portions (B). The L* value with the CIE color system (1976) is 73 to 75 at the red light color portions (R), 95 to 97 at the green light color portions (G), and around 72 to 74 at the blue light color portions (B).

Further, the area of a triangle having as the apexes thereof three points corresponding to the hue of the above red light color portions (R), green light color portions (G), and the blue light color portions (B) is approximately 0.01 (on the xy chromaticity diagram) and approximately 1700 (on the a*b* chromaticity diagram).

As shown above, the relation in optical properties between the deep color portions and light color portions with regard to light density is such that the light color portions have a greater value than the deep color portions in the Y value or L* value which are equivalent to visually recognized transmissivity and brightness. Now, the values of the light color portions preferably are around 1.2 to 2.5 times that of the deep color portions. Also, with regard to the area of a triangle in a chromaticity diagram corresponding to the saturation, the area of the triangle of the chromaticity diagram for the deep color portions is larger than the area of the triangle in the chromaticity diagram for the light color portions. Now, the area of the triangle in the chromaticity diagram for the deep color portions is preferably 3 to 8 times the area of the triangle of the chromaticity diagram for the light color portions.

Also, the light density can be defined not only by such indicators of optical properties, but also by manufacturing conditions and structures. For example, there is the relation of more or less in the amount of coloring material such as pigment or dye mixed onto the colored layers in a dispersed state at the time of forming the colored layers of the color filter. That is to say, at the deep color portions, the amount (weight or volume) of coloring material per unit volume is greater than the light color portions.

[Electronic Equipment]

Figure 24:
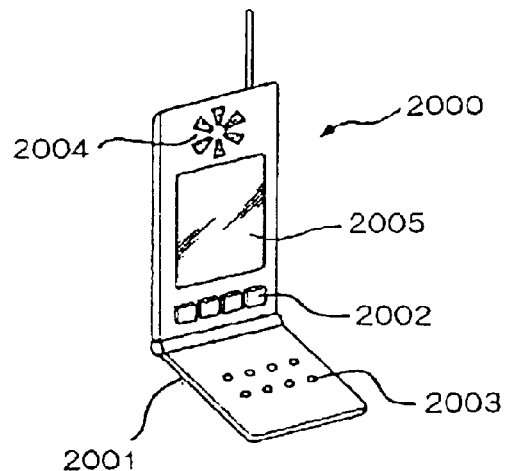
FIG. 24 is a schematic perspective diagram illustrating an external view of a cellular telephone as an example of electronic equipment comprising the Electro-optical device according to the embodiments.

Finally, a specific example of electronic equipment having the electro-optical device (liquid crystal display panel) according to the above embodiments will be described. FIG. 24 is a schematic perspective view illustrating the external view of a cellular telephone 2000 as an example of electronic equipment. The cellular telephone 2000 has an operating unit 2002 provided with operating switches on the surface of its casing 2001, and is also provided with an audio detecting unit 2003 including a detecting devices such as a microphone or the like, and an audio generating unit 2004 including an audio producing device such as a speaker or the like. A display unit 2005 is provided at a part of the casing 2001, so that a display screen of the electro-optical device according to the above embodiments disposed therewithin can be viewed through the display unit 2005. Display signals are sent to the electro-optical device from a control unit provided within the casing 2001, and display images corresponding to the display signals are displayed.

Figure 25:
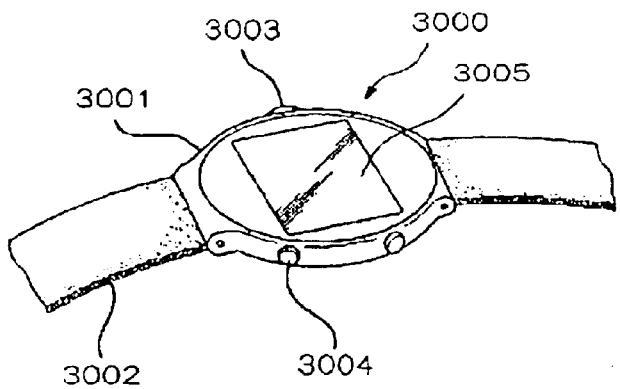
FIG. 25 is a schematic perspective diagram illustrating an external view of a clock (wristwatch) as an example of electronic equipment comprising the Electro-optical device according to the embodiments.

FIG. 25 is a schematic perspective view illustrating the external view of a wristwatch 3000 as an example of the electronic equipment. The wristwatch 3000 has a watch main unit 3001 and a watch band 3002. External operating members 3003 and 3004 are provided in the watch main unit 3001. Also, a display unit 3005 is provided on the front face of the watch main unit 3001, and a display screen of the electro-optical device according to the above embodiments disposed therewithin can be viewed through the display unit 3005. Display signals are sent to the electro-optical device from a control unit (clock circuit) provided within the watch main unit 3001, and display images corresponding to the display signals are displayed.

Figure 26:
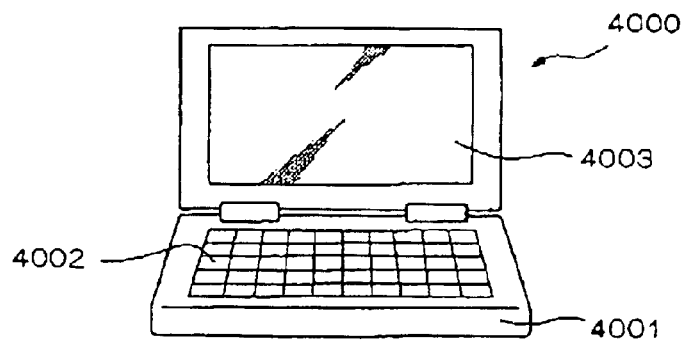
FIG. 26 is a schematic perspective diagram illustrating an external view of a computer (information terminal) as an example of electronic equipment comprising the Electro-optical device according to the embodiments.

FIG. 26 is a schematic perspective view illustrating the external view of a computer device 4000 as another example of the electronic equipment. The computer device 4000 has an MPU (Micro Processor Unit) provided within a main unit 4001, and an operating unit 4002 is provided on the outer face of the main unit 4001. Also, a display unit 4003 is provided, and the electro-optical device according to the above embodiments can be stored within the display unit 4003. It is arranged so that the display screen of the electro-optical device can be viewed through the display unit 4003. The electro-optical device is configured so as to receive display signals from the MPU provided within the main unit 4001, and displays images corresponding to the display signals.

Note that the color filter substrate and electro-optical device according to the present invention, the manufacturing method of the color filter substrate and the manufacturing method of the electro-optical device, and the electronic equipment are not restricted to those in the above-described illustrated examples, and it is needless to say that various modifications may be applied without departing from the spirit and scope of the present invention.

For example, in the above-described various embodiments, a passive-matrix type liquid crystal display panel has been given as an example in each case, but active-matrix liquid crystal display panels (e.g., liquid crystal display panels having TFTs (thin-film transistors) or TFDs (thin-film diodes) as switching devices) may be similarly applied as Electro-optical devices according to the present invention. Also, not only liquid crystal display panels, but the present invention may also be applied to various types of electro-optical devices wherein the display state can be controlled in increments of multiple pixels, such as electro-luminescence devices, organic electro-luminescence devices, plasma display devices, and so forth.

Further, the color filter substrate according to the present invention is not restricted to the electro-optical deices, and may be used with various types of display devices, image-taking devices, and other various types of optical devices.

What is claimed is:

1. A color filter substrate, comprising:

a substrate;

a reflective layer disposed on said substrate, said reflective layer including a transmitting portion capable of transmitting light;

a colored layer disposed on said reflective layer, said colored layer including a light color portion and a deep color portion, said deep color portion including the same color as the light color portion and a higher color density than said light color portion; and a transmissive layer disposed above said reflective layer, said transmissive layer including an aperture corresponding to said transmitting portion of said reflective layer, wherein said deep color portion is arranged in a region corresponding to said aperture, said light color portion is arranged in a region adjacent to the region corresponding to said aperture.

2. The color filter substrate according to claim 1, wherein said colored layer is disposed between said reflective layer and said transmissive layer.

3. The color filter substrate according to claim 2, wherein said transmissive layer is disposed on said deep color portion of said color layer.

4. The color filter substrate according to claim 1, further comprising a foundation layer including fine indentations on a surface of said foundation layer, said foundation layer partially disposed between said reflective layer and said substrate, wherein said deep color portion is disposed in a region adjacent to said transmissive layer.

5. The color filter substrate according to claim 1, wherein the color density of the deep color portion is between about 1.4 and about 2.6 times that of the light color portion.

6. An electro-optical device, comprising:

a first and a second substrate;

an electro-optical layer containing electro-optical material held between the first and second substrates;

a reflective layer disposed on said first substrate, said reflective layer including a transmitting portion capable of transmitting light;

a colored layer disposed on said reflective layer, said colored layer including a light color portion and a deep color portion, said deep color portion including the same color as the light color portion and a higher color density than said light color portion; and a transmissive layer disposed above said reflective layer, said transmissive layer including an aperture corresponding to said transmitting portion of said reflective layer, said electro-optical layer being thicker in a region corresponding to said aperture than in a region adjacent said region corresponding to said aperture, wherein said deep color portion is arranged in the region corresponding to said aperture, said light color portion is arranged in the adjacent region.

7. The electro-optical device according to claim 6, wherein said colored layer is disposed between said reflective layer and said transmissive layer.

8. The electro-optical device according to claim 7, wherein said transmissive layer is disposed on said deep color portion of said colored layer.

9. The electro-optical device according to claim 6 further comprising a foundation layer including fine indentations on a surface of said foundation layer, said foundation layer partially disposed between said reflective layer and said first substrate, wherein said deep color portion is disposed adjacent said transmissive layer.

10. A manufacturing method for a color filter substrate, comprising:

forming a reflective layer including a transmitting portion capable of transmitting light on a substrate;

forming a transmissive layer including an aperture corresponding to said transmitting portion above said reflective layer;

forming a deep color portion of a colored layer in a first region corresponding to said transmitting portion above said reflective layer; and forming a light color portion of a colored layer in a second region adjacent to said first region, said light color portion including the same color as the deep color portion and a lower color density than said deep color portion.

* * * * *

UNITED STATES PATENT AND TRADEMARK OFFICE
CERTIFICATE OF CORRECTION

PATENT NO.   : 6,785,068 B2
DATED        : August 31, 2004
INVENTOR(S)  : Keiji Takizawa and Yoshihiro Otagiri It is certified that error appears in the above-identified patent and that said Letters Patent is hereby corrected as shown below:

Title page,
Item [*] Notice, insert -- Terminal Disclaimer citing co-pending US application Serial No. 10/310,636 filed December 5, 2002 --.

Column 1,
Line 45, delete "a".

Column 2,
Line 59, "n" should be -- in --.
Line 62, "of" should be -- or --.

Column 4,
Line 25, "thorough" should be -- through --.

Column 13,
Line 28, "552c" should be -- 522c --.

Column 14,
Line 55, "preferabe" should be -- preferable --.

Column 15,
Line 10, "a" should be -- an --.
Line 28, "X" should be -- $\lambda$ --.

Column 18,
Line 46, delete "and".

Column 25,
Lines 49, 51 and 66, "Ah" should be -- $\Delta$h --.

Column 29,
Line 8, "ransmissivity" should be -- transmissivity --.
Line 40, "thorugh" should be -- through --.

UNITED STATES PATENT AND TRADEMARK OFFICE
CERTIFICATE OF CORRECTION

PATENT NO. : 6,785,068 B2
DATED : August 31, 2004
INVENTOR(S) : Keiji Takizawa and Yoshihiro Otagiri It is certified that error appears in the above-identified patent and that said Letters Patent is hereby corrected as shown below:

Column 31,
Line 15, "deices" should be -- devices --.

Signed and Sealed this

Eighteenth Day of October, 2005

JON W. DUDAS
*Director of the United States Patent and Trademark Office*